United States Patent
Suito et al.

(10) Patent No.: US 8,244,797 B2
(45) Date of Patent: Aug. 14, 2012

(54) INFORMATION SUPPLEMENTING DEVICE, SYSTEM, METHOD AND PROGRAM

(75) Inventors: Akiko Suito, Tokyo (JP); Yoshiyuki Koseki, Tokyo (JP); Katsuhiro Ochiai, Tokyo (JP); Masahiro Tabuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 1163 days.

(21) Appl. No.: 11/571,219

(22) PCT Filed: Jun. 23, 2005

(86) PCT No.: PCT/JP2005/012009
§ 371 (c)(1),
(2), (4) Date: May 10, 2007

(87) PCT Pub. No.: WO2006/001491
PCT Pub. Date: Jan. 5, 2006

(65) Prior Publication Data
US 2008/0010604 A1    Jan. 10, 2008

(30) Foreign Application Priority Data

Jun. 23, 2004 (JP) .................................. 2004-184859

(51) Int. Cl.
*G06F 15/16* (2006.01)
(52) U.S. Cl. ......... 709/203; 709/224; 709/225; 709/226
(58) Field of Classification Search .................... 709/203
See application file for complete search history.

(56) References Cited

U.S. PATENT DOCUMENTS

| | | | | |
|---|---|---|---|---|
| 6,219,679 B1 * | 4/2001 | Brisebois et al. | ............. | 715/206 |
| 6,275,862 B1 * | 8/2001 | Sharma et al. | ................ | 709/245 |
| 6,405,222 B1 * | 6/2002 | Kunzinger et al. | ........... | 715/205 |
| 6,535,912 B1 * | 3/2003 | Anupam et al. | .............. | 709/217 |
| 6,826,553 B1 * | 11/2004 | DaCosta et al. | .................. | 707/1 |
| 6,961,751 B1 * | 11/2005 | Bates et al. | .................... | 709/203 |
| 7,249,315 B2 * | 7/2007 | Moetteli | ....................... | 715/234 |
| 7,313,525 B1 * | 12/2007 | Packingham et al. | ......... | 704/270 |
| 2002/0038354 A1 * | 3/2002 | Ogasawara | ................... | 709/217 |

(Continued)

FOREIGN PATENT DOCUMENTS

JP    02-202154 A    8/1990

(Continued)

OTHER PUBLICATIONS

Takayuki Umeda et al. "WWW ni Okeru Navigation Rireki no Sanjigen Shikakuka ni Yoru Joho Kensaku Shien" Information Processing Society of Japan Kenkyu Hokoku, May 22, 1998, vol. 98, No. 42, pp. 47-52, ISSN: 0919-6072.

(Continued)

*Primary Examiner* — Firmin Backer
*Assistant Examiner* — Jonathan Bui
(74) *Attorney, Agent, or Firm* — Sughrue Mion, PLLC

(57) ABSTRACT

With an operation information supplement instructing unit (16), a service progress dependent information storage unit (11), a service progress dependent information search unit (12) and a service progress dependent information answering unit (13) provided, when the operation information supplement instructing unit (16) is pressed, the service progress dependent information search unit (12) searches the service progress dependent information storage unit (11) for supplemental contents recorded in pair with the same service progress as a current service progress (information indicating how far service progresses) and presents the searched supplemental contents to a user through the service progress dependent information answering unit (13).

19 Claims, 17 Drawing Sheets

U.S. PATENT DOCUMENTS

| | | | |
|---|---|---|---|
| 2002/0163532 A1* | 11/2002 | Thomas et al. | 345/723 |
| 2003/0027112 A1* | 2/2003 | Warneke et al. | 434/167 |
| 2008/0222552 A1* | 9/2008 | Batarseh et al. | 715/776 |

FOREIGN PATENT DOCUMENTS

| | | |
|---|---|---|
| JP | 10-021192 A | 1/1998 |
| JP | 11-007425 A | 1/1999 |
| JP | 11-039205 A | 2/1999 |
| JP | 11-161717 A | 6/1999 |
| JP | 2000-076266 A | 3/2000 |

OTHER PUBLICATIONS

Chinese Office Action issued in corresponding Chinese Patent Application No. 200580028453.4, dated Mar. 28, 2008, Partial English Translation.

* cited by examiner

FIG. 15

| 313 INDEX 003 | 314 TERMINAL IDENTIFIER REGISTERED IN INDEX 003 | 315 SERVICE PROGRESS REGISTERED IN INDEX 003 | 316 OPERATION INFORMATION REGISTERED IN INDEX 003 |
|---|---|---|---|
| 003 | 1234 | http://www.nec.co.jp/top.asp & link=loginasp<br>(306) (308) (321) | input=idxxx&passxxx & push=name:login<br>(322) (323)<br>& link=order_state.asp & link=dxeck.asp<br>(324) (325) |

| 317 INDEX 004 | 318 TERMINAL IDENTIFIER REGISTERED IN INDEX 004 | 319 SERVICE PROGRESS REGISTERED IN INDEX 004 | 320 OPERATION INFORMATION REGISTERED IN INDEX 004 |
|---|---|---|---|
| 004 | 1234 | http://www.nec.co.jp/top.asp & link=loginasp | input=idxxx&passxxx & push=name:login<br>& link=order_state.asp & link=tidxet.asp<br>(326) |

INFORMATION SUPPLEMENTING DEVICE, SYSTEM, METHOD AND PROGRAM

This application claims priority from PCT Application No. PCT/JP2005/012009 filed Jun. 23, 2005, and from Japanese Patent Application No. 2004-184859 filed Jun. 23, 2004, which applications are incorporated herein by reference.

FIELD OF THE INVENTION

The present invention relates to a device, a system and a method which mitigate a burden on operation incurred when a user receives information service, and a medium on which a program therefor is recorded.

DESCRIPTION OF THE RELATED ART

In general, a telephone set having an abbreviation button enables simplification of dialing operation by registering a telephone number of the same information service (e.g. a specific calling destination) at the abbreviation button and pressing the abbreviation button at the time of subsequent dialing so that the telephone number registered at the abbreviation button is reproduced.

With a Web browser having a bookmark function, with respect to the same information service (e.g. a specific Web site), URL (Uniform Resource Locator) indicative of its address is symbolized as a bookmark and added to selection menus, so that selection of the symbol from the menu leads to reproduction of the URL assigned to the symbol, thereby simplifying URL input operation.

Furthermore, among literature reciting a structure which takes into consideration simplification of operation by a user at a terminal to obtain information desired by the user are, for example, Japanese Patent Laying-Open No. 02-202154 (hereinafter referred to as Literature 1) and Japanese Patent Laying-Open No. 11-161717 (hereinafter referred to as Literature 2).

Literature 1 recites simplification of telephone number input operation which is realized by recording a telephone number in a storage means on a communication terminal in advance. Recorded telephone numbers are displayed on a display provided in the communication terminal in a descending order of dialing frequencies. In addition, to each telephone number to be displayed, an adjacent button is assigned. Pressing the adjacent button leads to dialing by the corresponding telephone number on the display.

Literature 2 recites recording, on a server, purchaser information as of previous order by a user to omit operation of inputting the purchaser information at subsequent order of a purchase.

The purchaser information includes information which specifies a user. The server assigns a client ID to the purchaser information and transmits the client ID to a client system used by the user at the time of order. With the client ID stored, the client system transmits the client ID and order information to the server when a user presses an order button at the time of order to follow.

A first problem of conventional art is that such an operation simplifying means as an abbreviation button or a bookmark menu is required as many as times as the number of pieces of operation reproduction information to be registered. This is because at an operation simplification means such as an abbreviation button or bookmarks, for example, specific operation reproduction information (telephone number, URL or the like) is registered to have one-to-one correspondence. As a known method of avoiding the problem is preparing a specific button for calling up a list of abbreviation buttons, sequentially displaying a subsequent candidate on the list at every pressing of the button and pressing a definition button which is prepared separately from the call-up button to determine the candidate being displayed as a telephone number to be reproduced. In a case where such an avoidance means as described above is used, when a necessary telephone number is registered tenth on the list, operation of pressing an abbreviation call-up button ten times is required, which, as compared with a procedure of dialing the telephone number, can not be considered to be simplification of the number of presses. The target simplified in this example is only replacement of a function of correctly storing a telephone number, which is not simplification of operation itself.

Also according to Literature 1, when a dialing frequency of a telephone number required is low, a user needs to repeatedly press a display switching switch until the required telephone number is displayed on the display, which can not be considered to have a less number of times of operation. Although the number of operation required each time is less than that of the above case of using the abbreviation dial because a display region occupied by a browser is in general large in the selection from a menu by bookmarks, the number of candidates to be selected is nonetheless increased with an increase in bookmarks, resulting in causing a problem of time consumed in visible check of a target to be selected.

A second problem is difficulty in simplification itself because there exists service that can not be directly reached by such a simplification means as an abbreviation dial or bookmarks. Even when simplification is possible, a condition of simplification is limited.

For example, in a case of a commonly known on-line shopping site, although its top page is reachable by bookmarks, operation is thereafter required of entering a member number and a password to execute personal authentication, selecting a product to be purchased from a menu on a screen thereafter presented and further pressing a "to purchase" button on a screen presented according to the selected menu to reach purchase. While purchase of expensive goods for taste often involves no problem because it happens not so frequently, as to purchase of daily necessaries, the same operation should be repeated every day or weekly and laborious.

Literature 2 recites improvement of preventing another input of purchaser information such as a user ID. Such data for supplement as purchaser information, however, is simply recorded itself and it is a server that decides under which condition the supplemental information should be used. Therefore, with this method, the server decides what and how much should be supplemented (simplified), and a user is not allowed to select simplification timing, the degree of supplement, a candidate for supplement and a target to be supplemented, so that use conditions are limited.

A main object of the present invention is to provide a device, a system, a method and a program which enable simplification of user operation without being directly correlated with the number of pieces of operation reproduction information to be registered.

Another object of the present invention is to provide a device, a system, a method and a program which enable simplification of user operation even when simplification of operation is difficult due to a problem of installation on a server side such as when direct reach is impossible by such a means as an abbreviation dial or bookmarks.

SUMMARY OF THE INVENTION

In order to achieve the above objects, outlines of the present invention disclosed by the present application are as follows.

A device according to one aspect of the present invention includes an operation information supplement instructing unit, a service progress dependent information storage unit, a service progress dependent information search unit and a service progress dependent information answering unit, in which based on an instruction from the operation information supplement instructing unit, the service progress information search unit searches the service progress dependent information storage unit for supplemental contents recorded in pair with the same service progress as a current service progress to indicate the searched supplemental contents to a user through the service progress dependent information answering unit.

In the present specification, "service progress" denotes a degree of progress which indicates to what level arbitrary service progresses. In service using Web, for example, there is a case where a service progress is found only by specifying a Web page being currently browsed and there is a case where a service progress is found based on path information leading to the Web page. In service requiring user input, there is a case where a service progress is found by an input item at which a cursor indicative of an input position locates. As other example, in service by voice guidance, a service progress may be found by a reproduction position or the like in some cases.

BRIEF DESCRIPTION OF THE DRAWINGS

FIG. 15 is a diagram showing one example of a data format in a service progress dependent information data base in the second embodiment;

DESCRIPTION OF EMBODIED CONFIGURATION OF THE INVENTION

Next, an embodied configuration for implementing the present invention will be described in the following.

Figure 1:
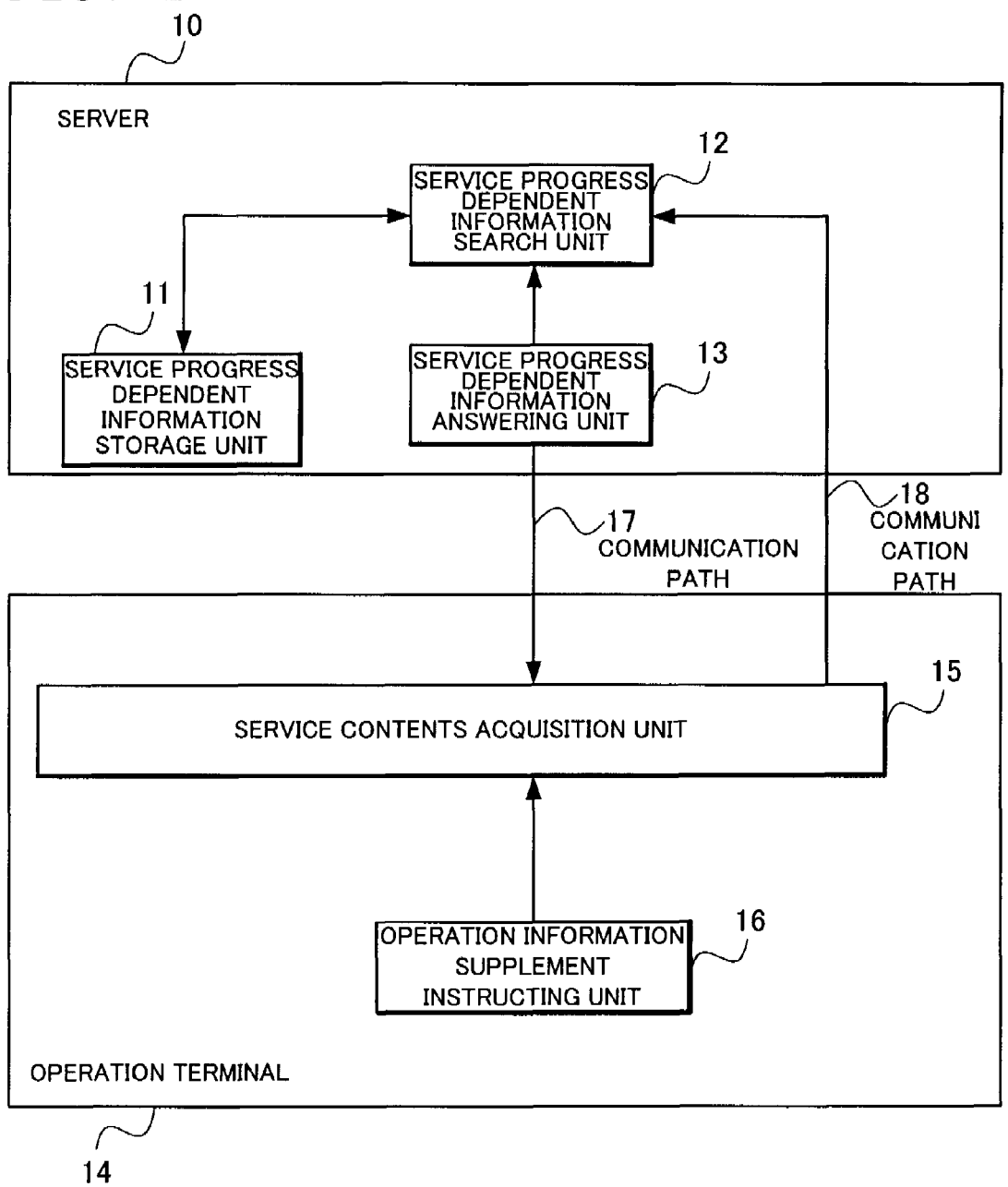
FIG. 1 is a block diagram showing structure of a first embodied configuration of the present invention.

FIG. 1 is a diagram showing structure of one embodied configuration of the present invention. With reference to FIG. 1, a system according to one embodied configuration of the present invention is formed of a server (10) for supplementing user operation depending on a progress of service provision to a user and an operation terminal (14) used by a user for using information service with communication paths (17, 18) provided therebetween.

The server (10) includes a service progress dependent information storage unit (11), a service progress dependent information search unit (12) and a service progress dependent information answering unit (13).

The operation terminal (14) includes a service contents acquisition unit (15) and an operation information supplement instructing unit (16). "Service contents" denotes at least one data forming information service. Among actual examples of a data format of service contents are Web page, video, moving image, continuous image, still image, voice and text. The service progress dependent information answering unit (13) holds service contents therein.

Roughly speaking, each unit provided in the server (10) and the operation terminal (14) has the following functions.

In the service progress dependent information storage unit (11) of the server (10), "supplemental contents" are recorded with operation information in an arbitrary service progress and the service progress paired. Operation information in an arbitrary service progress may be service contents in an arbitrary service progress or information for generating service contents in an arbitrary service progress. Supplemental contents are recorded in a recording medium such as a disk or a memory.

Upon an instruction on supplementing of operation information by the operation information supplement instructing unit (16), the service progress dependent information search unit (12) of the server (10) searches the service progress dependent information storage unit (11) to obtain operation information recorded as a pair with a service progress recorded in the service progress dependent information storage unit (11) which is coincident with a current service progress. A terminal identifier for use in the search is obtained from the operation terminal (14) through the communication path (18) in such a case where the supplement instruction is issued. A current service progress can be found, for example, by recording a latest transition state on the server (10) side every time transition is caused by the operation terminal (14).

Upon obtaining operation information in a current service progress from the service progress dependent information search unit (12), the service progress dependent information answering unit (13) of the server (10) operates, in place of a user, user operation and the like related to a blank and selection items on service contents or related to transition between service contents in the current service progress or the like by using the obtained operation information to supplement user operation required to reach an arbitrary service progress from the current service progress.

The service contents acquisition unit (15) of the operation terminal (14) obtains service contents with operation information supplemented from the service progress dependent information answering unit (13) of the server (10) through the communication path (17).

The operation information supplement instructing unit (16) of the operation terminal (14) is used for instructing on supplement of operation in a current service progress.

Next, with reference to the flow chart shown in FIG. 2, description will be made of operation related to recording of a service progress in the present embodied configuration.

By a service manager, the above supplemental contents are in advance recorded in the service progress dependent information storage unit (11) of the server (10).

The service progress dependent information search unit (12) of the server (10) constantly comprehends use conditions of information service, that is, a current service progress at the operation terminal (14) (Step S100). When a user inputs an arbitrary URL to a Web browser by the operation terminal (14) to connect to the server (10), for example, operation information that the arbitrary URL has been input and a connection button has been pressed and a terminal identifier are transmitted from the service contents acquisition unit (15) of the operation terminal (14) to the service progress dependent information search unit (12) of the server (10) through the communication path (18).

As a result, the service progress dependent information search unit (12) of the server (10) is allowed to know that the user has an arbitrary Web page displayed (this time point is assumed to be a service progress [1]=current service progress). When an arbitrary Web page is displayed, for making transition from the currently displayed Web page to a Web page traced through a link and displaying the page traced by the link, with link information obtained by tracing from the currently displayed Web page as operation information, the operation information and a terminal identifier are transmitted from the service contents acquisition unit (15) of the operation terminal (14) to the service progress dependent information search unit (12) of the server (10) through the communication path (18).

By adding later obtained operation information to the service progress [1], the service progress dependent information search unit (12) of the server (10) finds that the user has displaying of a Web page traced from a page of the service progress [1] through a link to update the current service progress.

Thus, the service progress dependent information search unit (12) of the server (10) is allowed to constantly know the latest transition state when service transition is caused by the operation terminal (14).

When at Step S100, the service progress dependent information search unit (12) of the server (10) fails to obtain a terminal identifier from the service contents acquisition unit (15) of the operation terminal (14), the service progress dependent information search unit (12) assigns a new terminal identifier to the operation terminal (14) to store the terminal identifier in an internal storage unit (not shown) of the service progress dependent information search unit (12), as well as transmitting the same to the operation terminal (14) (Step S101). Upon receiving the terminal identifier, the operation terminal (14) stores the identifier in an internal storage unit (not shown) in the operation terminal (14).

The service progress dependent information search unit (12) of the server (10) preserves current service progress information with the terminal identifier obtained from the service contents acquisition unit (15) of the operation terminal (14) or the terminal identifier assigned by the service progress dependent information search unit (12) of the server (10) and a current service progress paired in the internal storage unit (not shown) in the service progress dependent information search unit (12) (Step S102).

Operation from Step S100 to S102 continues until service ends in some form or other in such a case of normal end when all the service is completed or a case of abnormal end when communication is interrupted (Step S103).

In place of the service progress dependent information search unit (12) of the server (10),
assignment of a terminal identifier
preservation of current service progress information
which are executed by the service progress dependent information search unit (12) at Step S101, may be executed by the service progress dependent information storage unit (11) or the service progress dependent information answering unit (13) of the server (10). In this case, the service progress dependent information search unit (12) of the server (10) notifies the service progress dependent information storage unit (11) or the service progress dependent information answering unit (13) of the server (10) that no terminal identifier is obtained from the service contents acquisition unit (15) of the operation terminal (14), or of a terminal identifier obtained through the communication path (18) and a current service progress. The service progress dependent information storage unit (11) or the service progress dependent information answering unit (13) of the server (10) obtains the above notification to assign a terminal identifier or preserves the current service progress information.

Next, with reference to the flow chart shown in FIG. 3, description will be made of operation executed at the time of reproduction of operation information in an arbitrary service progress.

First, at the use of information service, when operation for realizing a desired arbitrary service progress from a current service progress is to be supplemented, by operating the operation information supplement instructing unit (16) of the operation terminal (14), the user instructs the service contents acquisition unit (15) of the operation terminal (14) to supplement the operation (Step S200).

At the operation terminal (14), the service contents acquisition unit (15) being instructed to supplement the operation notifies the service progress dependent information search unit (12) in the server (10) of supplement request information (which indicates that supplementing of operation is instructed by the user and includes a terminal identifier).

Upon obtaining the supplement request information from the service contents acquisition unit (15) of the operation terminal (14), the service progress dependent information search unit (12) of the server (10) collates the terminal identifier contained in the supplement request information and a terminal identifier contained in the current service information to obtain a service progress recorded in pair with the terminal identifier contained in the supplement request information (Step S201).

The service progress dependent information search unit (12) of the server (10) collates the service progress obtained at Step S201 and a service progress recorded in the service progress dependent information storage unit (11) to obtain operation information recorded as a pair with the service progress obtained at Step S201 (Step S202).

The service progress dependent information search unit (12) transmits the service progress obtained at Step S201, the operation information obtained at Step S202 and the terminal identifier obtained from the service contents acquisition unit (15) of the operation terminal (14) to the service progress dependent information answering unit (13).

As a result of collation at Step S202 by the service progress dependent information search unit (12) of the server (10)

between the service progress obtained at Step S201 and the service progress recorded in the service progress dependent information storage unit (11), when there fails to exist the service progress obtained at Step S201, move onto Step S204.

When obtaining, from the service progress dependent information search unit (12), the service progress obtained at Step S201, the operation information obtained at Step S202 and the terminal identifier obtained from the service contents acquisition unit (15) of the operation terminal (14), the service progress dependent information answering unit (13) of the server (10) vicariously executes user operation based on the operation information to supplement the user operation to reach the arbitrary service progress from the relevant service progress. The arbitrary service progress as the above reaching destination is a service progress as of when operation information is vicariously executed in the current service progress, which is decided when the service manager records supplemental contents in the service progress dependent information storage unit (11) (Step S203).

Operation from Step S200 to S203 continues until service ends in some form or other in such a case of normal end when all the service is completed or a case of abnormal end when communication is interrupted (Step S204).

The service progress dependence information storage unit (11) of the server (10) may record "supplemental contents" with operation information in an arbitrary service progress, the service progress and a terminal identifier in combination. In this case, at Step S202, the service progress dependent information search unit (12) obtains, based on the pair of the service progress and the terminal identifier obtained at Step S201, operation information having a pair of a service progress and a terminal identifier coincident with the pair in question from the service progress dependent information storage unit (11).

According to the first embodied configuration of the present invention, the server (10) records operation information in an arbitrary service progress and the service progress in pair and supplements user operation according to a service progress of a user based on the recorded operation information to automatically or semi-automatically advance service to an arbitrary service progress desired by a service manager or the user.

Next, a second embodied configuration of the present invention will be described.

Figure 4:
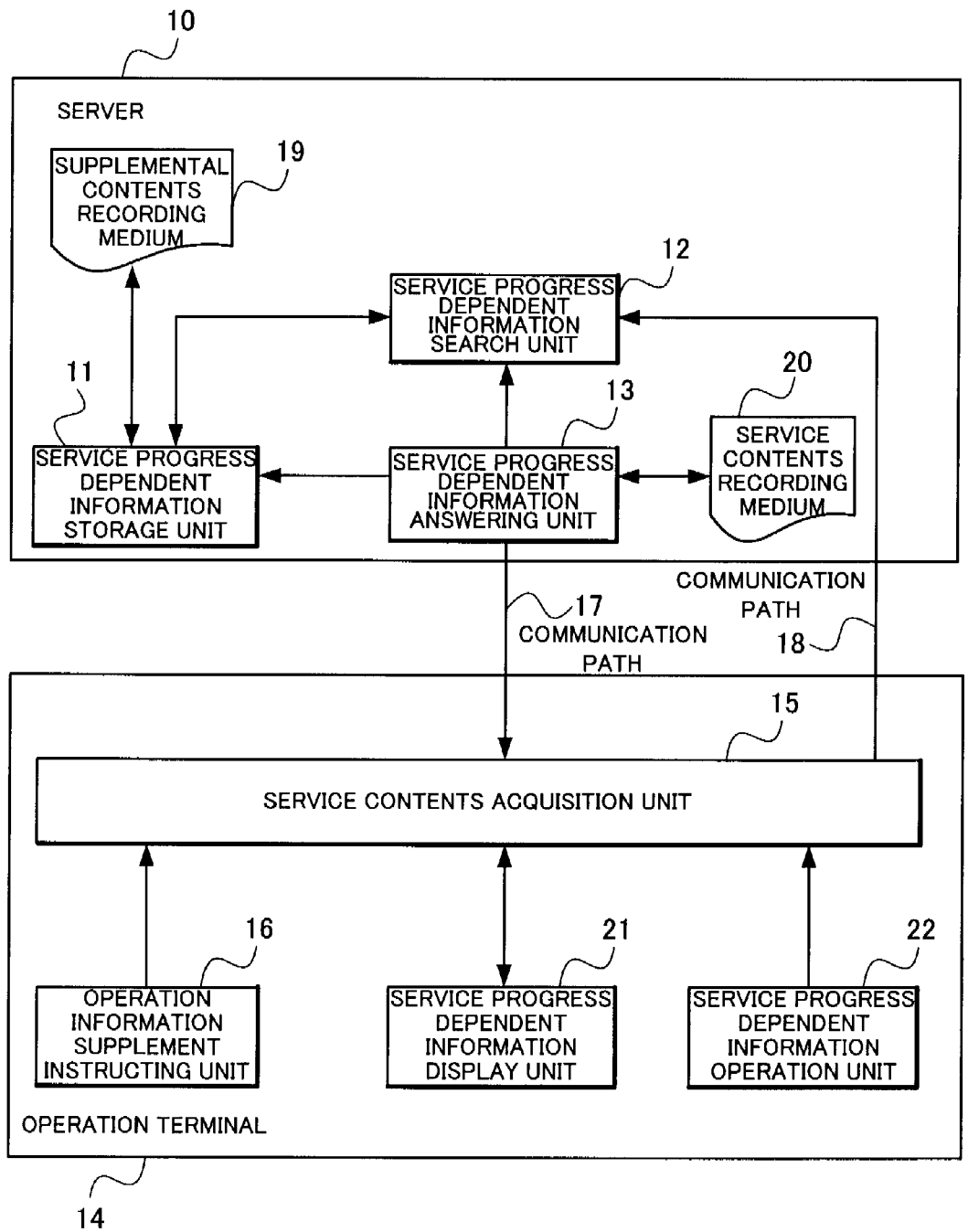
FIG. 4 is a block diagram showing structure of a second embodied configuration of the present invention.

FIG. 4 is a diagram showing structure of the second embodied configuration of the present invention. With reference to FIG. 4, a system according to the present embodied configuration is formed of the server (10) for supplementing user operation depending on a progress of service provision to a user and the operation terminal (14) used by a user for using information service with the communication paths (17, 18) provided therebetween.

The server (10) includes the service progress dependent information storage unit (11), the service progress dependent information search unit (12), the service progress dependent information answering unit (13), a supplemental contents recording medium (19) and a service contents recording medium (20).

The operation terminal (14) includes the service contents acquisition unit (15), the operation information supplement instructing unit (16), a display unit (21) used by a user (hereinafter referred to as "service progress dependent information display unit") and an operation unit (22) used by a user (hereinafter referred to as "service progress dependent information operation unit").

Roughly speaking, each unit provided in the server (10) and the operation terminal (14) has the following functions.

The service progress dependent information storage unit (11) of the server (10) has the same function as that of the service progress dependent information storage unit (11) of the above first embodied configuration shown in FIG. 1. The unit records, in the supplemental contents recording medium (19), "supplemental contents" with operation information in an arbitrary service progress and the service progress paired or operation information in an arbitrary service progress, the service progress and a terminal identifier as a combination. The supplemental contents recording medium (19) is a recording medium such as a disk or a memory.

The service progress dependent information search unit (12) of the server (10) has the same function as that of the service progress dependent information search unit (12) shown in FIG. 1.

The service progress dependent information search unit (12), similarly to the service progress dependent information search unit (12) according to the above first embodied configuration shown in FIG. 1, comprehends a current service progress and preserves "current service progress information" with the terminal identifier of the operation terminal (14) and the current service progress paired. Upon instruction on supplementing of operation information made by the operation information supplement instructing unit (16) of the operation terminal (14), the service progress dependent information search unit (12) searches the service progress dependent information storage unit (11) to obtain operation information recorded as a pair with a service progress recorded in the service progress dependent information storage unit (11) which is coincident with the current service progress.

Furthermore, upon an instruction on registering of operation information by the operation information supplement instructing unit (16) of the operation terminal (14), the service progress dependent information search unit (12) of the server (10) notifies the service progress dependent information storage unit (11) to record operation information in the current service progress, the service progress and the terminal identifier in combination.

The service progress dependent information answering unit (13) of the server (10) has the same function as that of the service progress dependent information answering unit (13) according to the above first embodied configuration shown in FIG. 1. Similarly to the service progress dependent information answering unit (13) shown in FIG. 1, upon obtaining operation information in a current service progress from the service progress dependent information search unit (12), by operating, in place of a user, user operation related to a blank or selection items on service contents or related to transition between service contents in the current service progress or the like by using the obtained operation information, the unit (13) supplements user operation required to reach an arbitrary service progress from the current service progress.

The service contents acquisition unit (15) of the operation terminal (14) has the same function as that of the service contents acquisition unit (15) according to the above first embodied configuration shown in FIG. 1. The service contents acquisition unit (15) obtains service contents with operation information supplemented from the service progress dependent information answering unit (13) through the communication path (17).

The operation information supplement instructing unit (16) of the operation terminal (14) has the same function as that of the operation information supplement instructing unit (16) according to the above first embodied configuration shown in FIG. 1. The operation information supplement instructing unit (16) is used for instructing on supplementing of operation in a current service progress and further for instructing on registering of operation in the supplemental contents recording medium (19).

The service progress dependent information display unit (21) of the operation terminal (14) has a display medium such as a display to present service contents obtained from the service contents acquisition unit (15). The operation information supplement instructing unit (16) may be presented in the service progress dependent information display unit (21).

The service progress dependent information operation unit (22) of the operation terminal (14) is a button, a dial or a keyboard attached to the operation terminal (14), which is for use in executing necessary operation when a user uses information service. Alternatively, the operation terminal (14) may include a microphone which microphone takes in voice of a user to operate the terminal by the voice. The service progress dependent information operation unit (22) of the operation terminal (14) may be presented in the service progress dependent information display unit (21).

Figure 5:
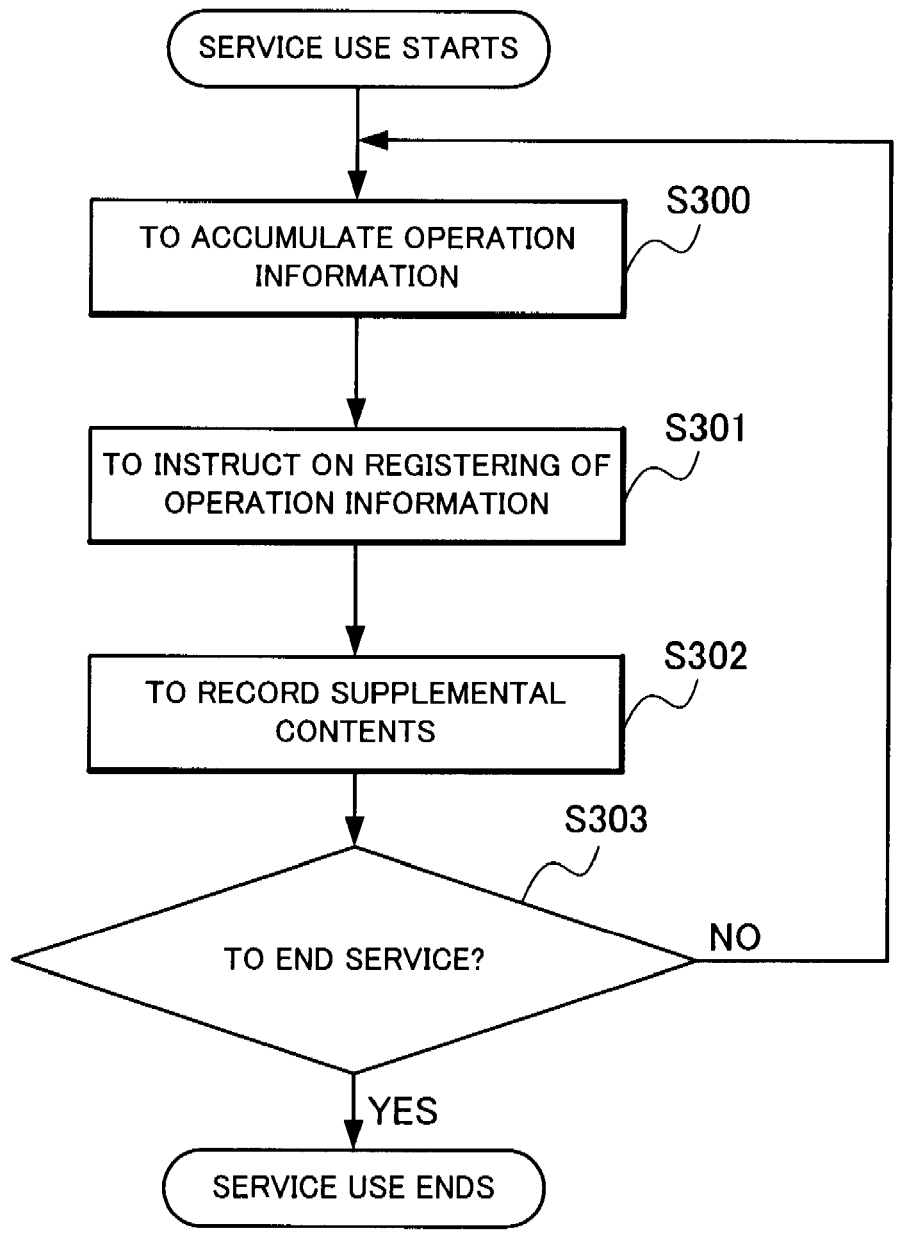
FIG. 5 is a flow chart indicative of operation executed at reproduction of operation information in an arbitrary service progress in a best mode for implementing a second invention.

Next, with reference to the flow chart shown in FIG. 5, operation related to recording of user operation will be described in the present embodied configuration.

When registering user operation in an arbitrary service progress, a range of user operation to be registered is determined at the time of operation start and operation end by operating the operation information supplement instructing unit (16) of the operation terminal (14).

Prior to execution of operation to be registered, the user uses the operation information supplement instructing unit (16) of the operation terminal (14) to notify the service progress dependent information search unit (12) of the server (10) of "operation information start request information" through the service contents acquisition unit (15) of the operation terminal (14) and the communication path (18). The "operation information start request information" includes a terminal identifier of the operation terminal (14).

Figure 2:
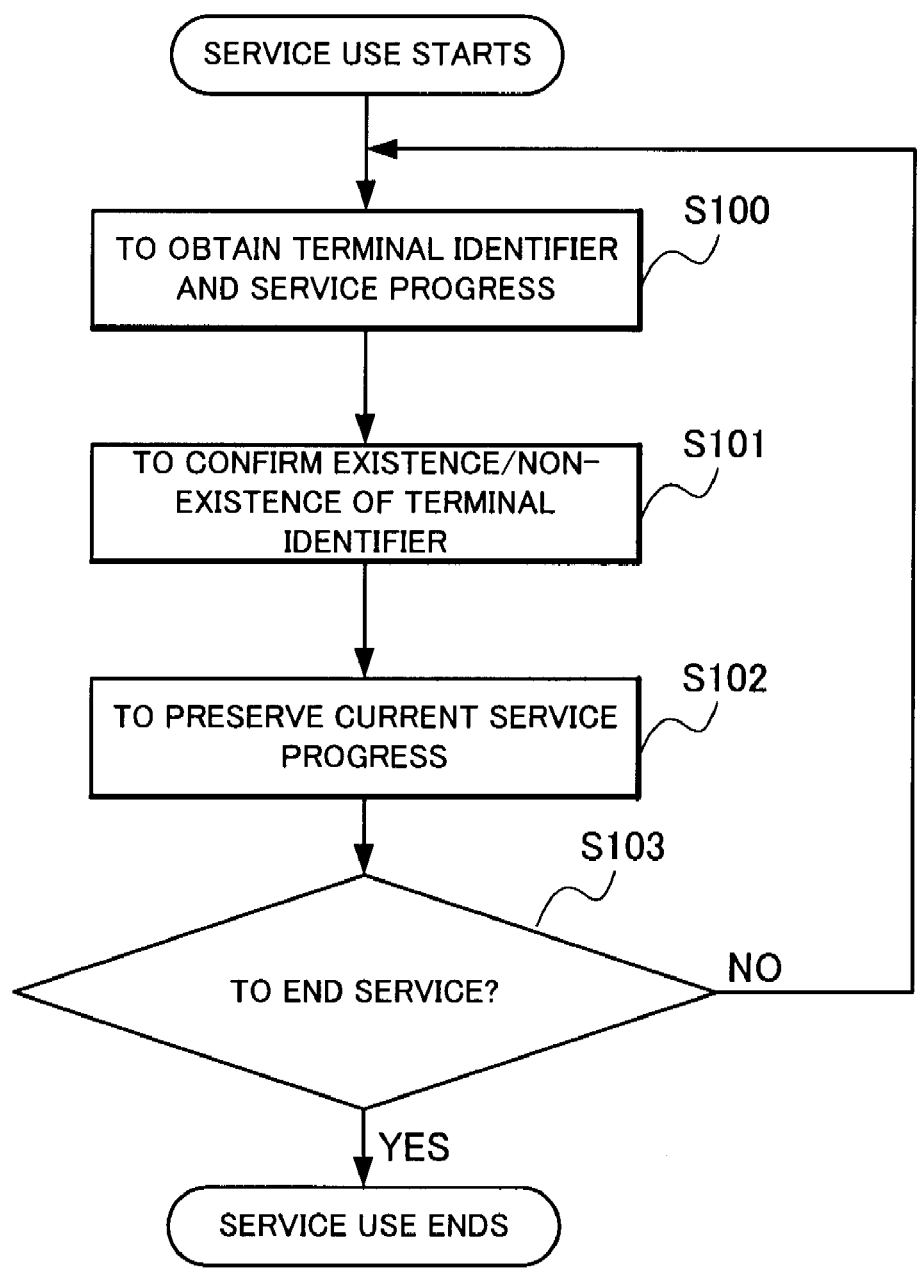
FIG. 2 is a flow chart indicative of operation related to recording of a service progress in a best mode for implementing a first invention.

Upon obtaining the operation information start request information including a terminal identifier from the service contents acquisition unit (15), the service progress dependent information search unit (12) of the server (10) obtains a current service progress recorded in pair with the terminal identifier contained in the operation information start request information from the current service progress information preserved at Step S102 in FIG. 2.

The service progress dependent information search unit (12) of the server (10) preserves "registration candidate service progress information" with the obtained current service progress (=registration candidate service progress) and the terminal identifier contained in the operation information start request information paired. Furthermore, information operated by the user by using the service progress dependent information operation unit (22) is accumulated within the operation terminal (14) (Step S300).

Upon completion of the operation to be registered, the user again notifies the service progress dependent information search unit (12) of "operation information registration request information" by using the operation information supplement instructing unit (16) of the operation terminal (14). The operation information registration request information includes the terminal identifier of the operation terminal (14) and the operation information accumulated in the operation terminal (14) (Step S301).

The service progress dependent information search unit (12) of the server (10) collates the terminal identifier contained in the operation information registration request information and the terminal identifier recorded in the registration candidate service progress information to obtain a service progress (as of the operation start) recorded as a pair with the terminal identifier contained in the operation information registration request information.

The service progress dependent information search unit (12) of the server (10) transmits the operation information and the terminal identifier contained in the operation information registration request information and the obtained service progress as of the operation start to the service progress dependent information storage unit (11).

The service progress dependent information storage unit (11) of the server (10) checks whether there already exists in the supplemental contents recording medium (19) a combination of the service progress as of the operation start, the terminal identifier and the operation information obtained from the service progress dependent information search unit (12) and when there fails to exit a combination of the same contents, records, in the supplemental contents recording medium (19), the supplemental contents with the service progress as of the operation start, the terminal identifier and the operation information as a combination (Step S302).

When confirming that there already exists in the supplemental contents recording medium (19) a combination of the service progress as of the operation start, the terminal identifier and the operation information obtained from the service progress dependent information search unit (12), the service progress dependent information storage unit (11) of the server (10) refrains from recording into the supplemental contents recording medium (19).

Operation from Step S300 to S302 continues until service ends in some form or other in such a case of normal end when all the service is completed or a case of abnormal end when communication is interrupted (Step S303).

The information operated by using the service progress dependent information operation unit (22) of the operation terminal (14) may be accumulated within the server (10) at Step S300. In this case, the service progress dependent information search unit (12) of the server (10) records registration candidate service progress information with a current service progress, a terminal identifier contained in the operation information registration request information and operation information of the user in combination.

A range of user operation to be registered at Step S301 may be operation executed from arbitrary time of communication (e.g. at the time when information service use starts etc.) to time of subsequent operation to be executed by the operation information supplement instructing unit (16), or operation to be executed from time of operation by the operation information supplement instructing unit (16) to time of communication end, or operation to be executed from arbitrary time of communication to time of communication end. When the time of information service use start (arbitrary time of communication) is considered as a service progress as of registration start, a service progress at a time point where a user starts communication with information service is recorded in registration candidate service progress information. On the other hand, in a case where at the end of communication, user operation to be executed until the end is automatically registered, before cutting off communication by the operation terminal (14), accumulated operation information and operation information registration request information including a terminal identifier are notified to the service progress dependent information search unit (12).

Before recording the combination of the current service progress, the terminal identifier and the operation information into the supplemental contents recording medium (19) at Step S302, a user may be asked whether to record it or not. In this case, the service progress dependent information search unit (12) of the server (10) notifies the service progress dependent information answering unit (13) of an "operation information recording inquiry request", and the service progress dependent information answering unit (13) generates contents for inquiring whether the operation information is to be recorded or not to present the contents to the service contents acquisition unit (15) of the operation terminal (14). By using the service progress dependent information operation unit (22) of the operation terminal (14), the user selects whether to record the operation information. The service contents acquisition unit (15) of the operation terminal (14) notifies the service progress dependent information search unit (12) of the user's selection result, and the service progress dependent information search unit (12) notifies the service progress dependent information storage unit (11) that when a result of selection to record the operation information is obtained, the contents are to be recorded and when a result of failure of selection to record the operation information is obtained, the same are not to be recorded.

Figure 6:
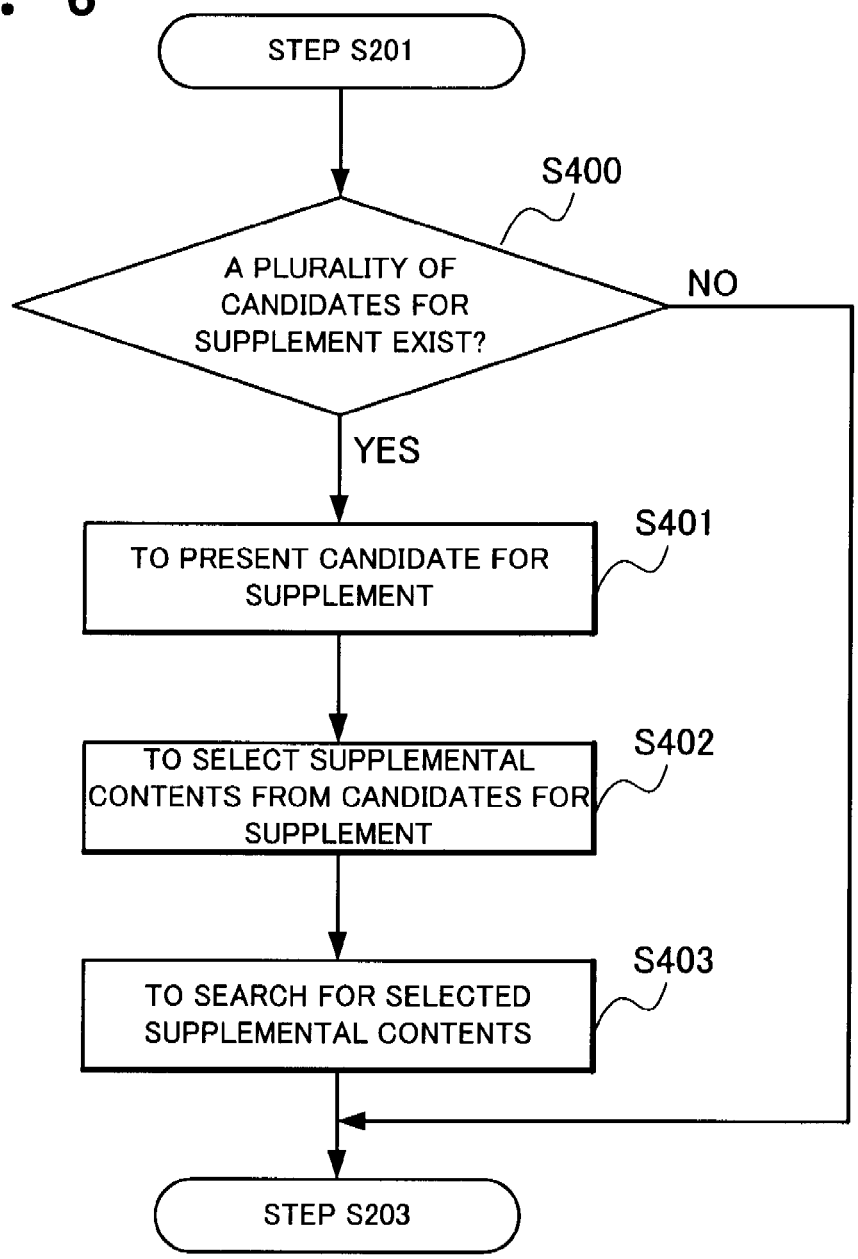
FIG. 6 is a flow chart indicative of operation of selecting one supplemental contents from a plurality of supplemental contents in an arbitrary service progress in the best mode for implementing the second invention.

Next, with reference to the flow chart shown in FIG. 6, description will be made of operation of selecting one supplemental contents from among a plurality of supplemental contents in an arbitrary service progress in the present embodied configuration.

Step S400 to Step S403 which will be described in the following are equivalent to a processing step executed when a service progress is searched to find a relevant service progress at Step S202 shown in FIG. 3.

The service progress dependent information search unit (12) of the server (10) collates the service progress obtained at Step S201 and a service progress recorded in the supplemental contents recording medium (19) to obtain operation information recorded in pair with the service progress obtained at Step S201. When there exist a plurality of pieces of operation information recorded in pair with the service progress obtained at Step S201 as a result of collation, a supplemental contents index for unitarily identifying the relevant plurality of pieces of operation information is obtained (Step S400). The supplemental contents index has a unique number assigned for each supplemental contents with operation information in a current service progress and the service progress in pair. When as a result of the collation, there exists at Step S400 only one operation information recorded as a pair with the service progress obtained at Step S201, move to Step S203 shown in FIG. 3.

The service progress dependent information search unit (12) of the server (10) notifies the service progress dependent information answering unit (13) of the supplemental contents candidate including the supplemental contents index and the terminal identifier of the operation terminal (14). The service progress dependent information answering unit (13) transmits service contents including the supplemental contents candidate to the operation terminal (14) having the terminal identifier obtained from the service progress dependent information search unit (12). The service contents acquisition unit (15) having obtained the service contents including the above supplemental contents candidate presents the obtained service contents to the service progress dependent information display unit (21) (Step S401). The service progress dependent information display unit (21) may provide presentation by voice guidance other than displaying.

The user selects one supplemental content candidate from among the plurality of supplemental contents candidates presented by the service progress dependent information display unit (21) by using the service progress dependent information operation unit (22) of the operation terminal (14) (Step S402). The service contents acquisition unit (15) of the operation terminal (14) obtains operation information which selects one supplemental contents candidate from the service progress dependent information operation unit (22) to notify the service progress dependent information search unit (12) of the selected supplemental contents index. The service progress dependent information search unit (12) obtains operation information with the above selected supplemental contents index allotted from the supplemental contents recording medium (19) (Step S403).

Operation related to recording of a service progress and operation executed when operation information in an arbitrary service progress is reproduced are assumed to be the same as those of the first embodied configuration of the present invention.

In the second embodied configuration of the present invention, in addition to the effect of the first embodied configuration of the present invention, a user is allowed to designate arbitrary timing for supplementing operation information (service progress) to record operation information accumulated by user's operation in the server (10). Moreover, when a plurality of pieces of operation information to be supplemented are recorded in an arbitrary service progress, operation information to be supplemented by a user can be selected.

Next, a third embodied configuration of the present invention will be described.

Figure 7:
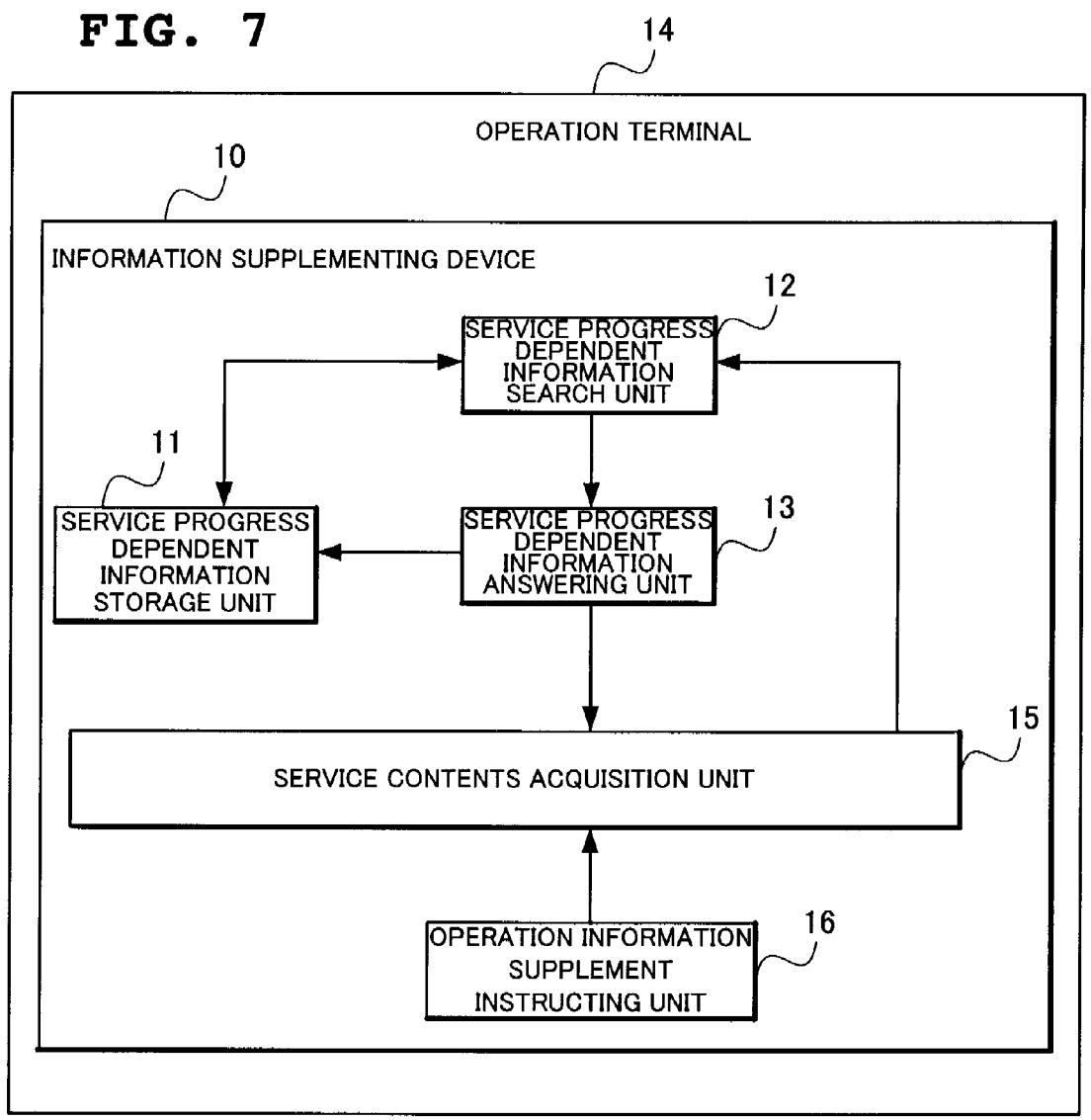
FIG. 7 is a block diagram showing structure of a third embodied configuration of the present invention.

FIG. 7 is a diagram showing structure of the third embodied configuration of the present invention. It is formed only of the operation terminal (14) used by a user for using information service. The operation terminal (14) has an information supplementing device (10) including the service progress dependent information storage unit (11), the service progress dependent information search unit (12), the service progress dependent information answering unit (13), the service contents acquisition unit (15) and the operation information supplement instructing unit (16).

Figure 3:
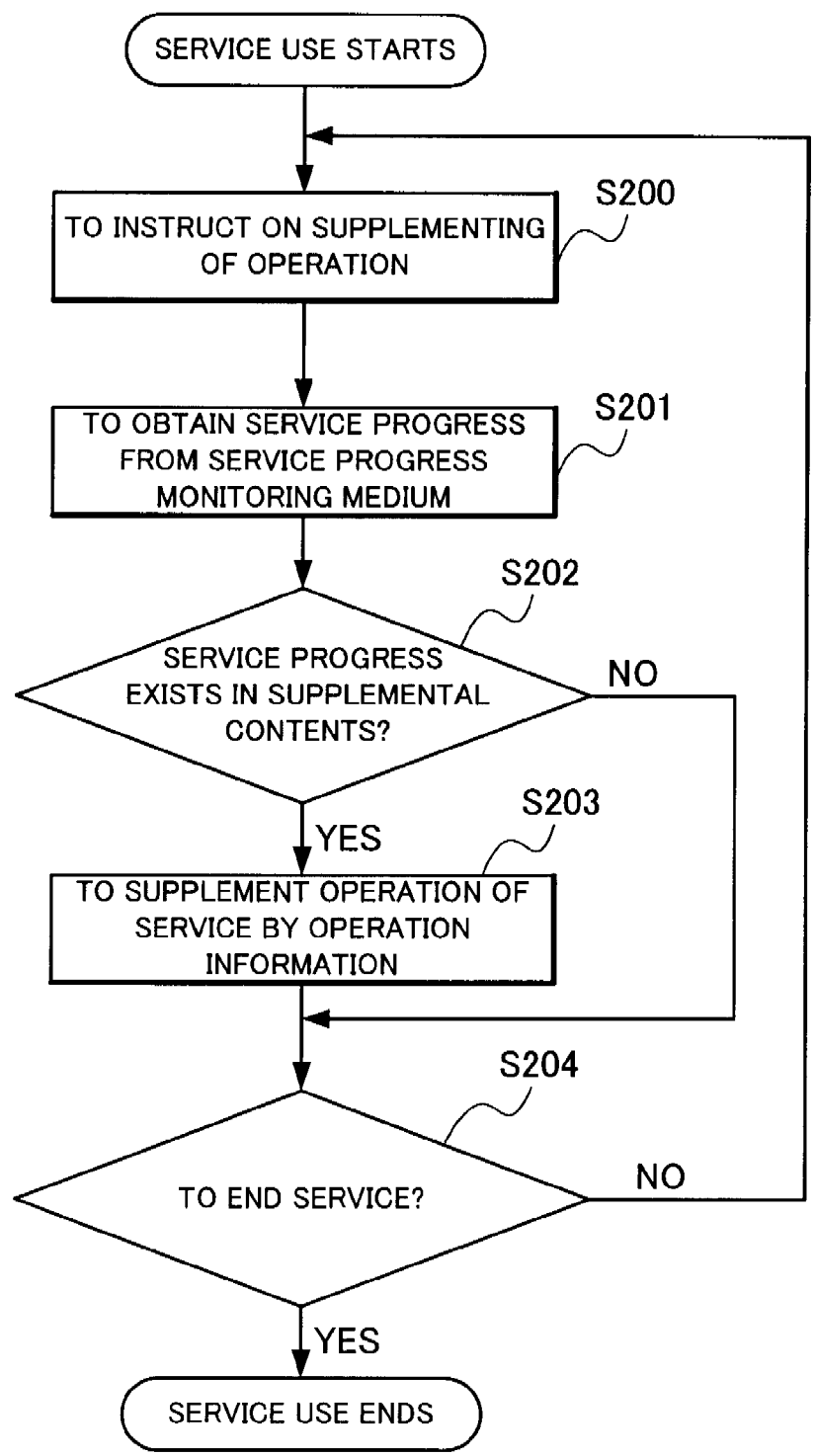
FIG. 3 is a flow chart indicative of operation executed at reproduction of operation information in an arbitrary service progress in the best mode for implementing the first invention.

Entire operation of the present embodied configuration is equivalent to the operation of the first embodied configuration of the present invention shown in FIG. 2 and FIG. 3. Particular difference from the operation of the first embodied configuration of the present invention resides in that with the service progress dependent information storage unit (11), the service progress dependent information search unit (12) and the service progress dependent information answering unit (13) provided in the operation terminal (14), the service contents acquisition unit (15) obtains service contents from the service progress dependent information answering unit (13) with no communication path provided therebetween.

In addition to the effect obtained by the first embodied configuration of the present invention, the third embodied configuration of the present invention enables a system without a server to be set up because it is formed only of the operation terminal (14). When handling operation information dependent on a terminal, the operation terminals (14) may be connected to use information service by remote operation. In addition, without being affected by traffic of a server or a communication path, information service can be used.

Next, a fourth embodied configuration of the present invention will be described.

Figure 8:
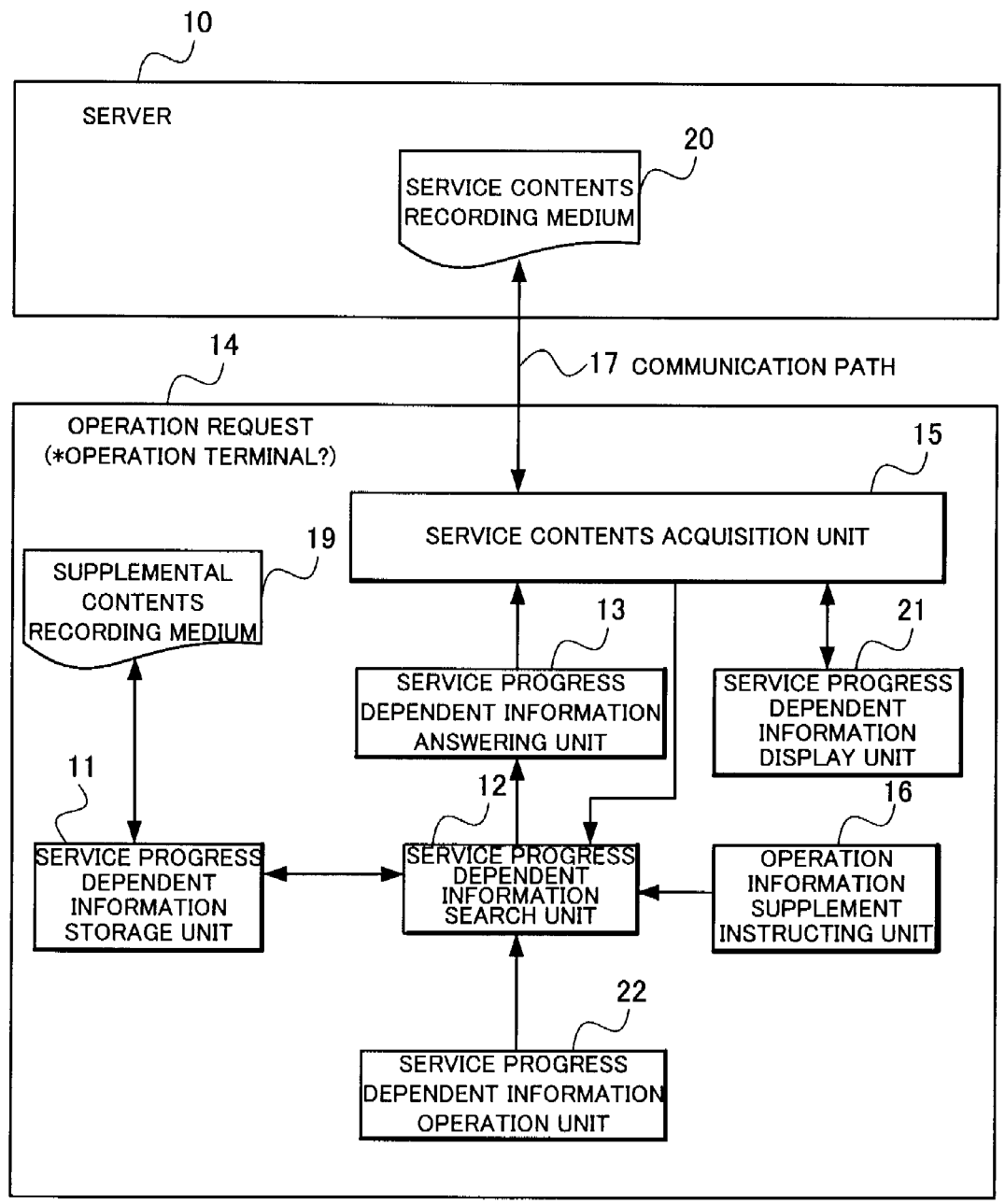
FIG. 8 is a block diagram showing structure of a best mode for implementing a fourth invention.

FIG. 8 is a diagram showing structure of the fourth embodied configuration of the present invention. Components are the same as those of the block according to the second embodied configuration of the present invention. The block is formed of the server (10) for providing information service and the operation terminal (14) used by a user for using information service with the communication path (17) provided therebetween.

The server (10) has the service contents recording medium (20).

The operation terminal (14) includes the supplemental contents recording medium (19), the service progress dependent information storage unit (11), the service progress dependent information search unit (12), the service progress dependent information answering unit (13), the service contents acquisition unit (15), the operation information supplement instructing unit (16), the service progress dependent information display unit (21) and the service progress dependent information operation unit (22).

Each unit that the operation terminal (14) has operates substantially equivalently to that of the second embodied configuration of the present invention. Next, different operation will be described.

In the second embodied configuration of the present invention, each information transmitted from the service contents acquisition unit (15) of the operation terminal (14) to the server (10) includes a terminal identifier for identifying the operation terminal (14). In the fourth embodied configuration of the present invention, on the other hand, because every unit is provided in the operation terminal (14), identification of the operation terminal (14) is unnecessary, so that each information transmitted from the service contents acquisition unit (15) to the server (10) fails to include a terminal identifier for identifying the operation terminal (14).

The service progress dependent information search unit (12) of the operation terminal (14) obtains operation information start request information, operation information registration request information and supplement request information from the operation information supplement instructing unit (16).

When in supplementing operation information, the service progress dependent information answering unit (13) obtains service contents from the service contents recording medium (20) through the service contents acquisition unit (15) and the communication path (17) in a case where service contents are required.

Next, entire operation of the present embodied configuration is equivalent to those shown in the flow charts of FIGS. 2, 3, 5 and 6 which illustrate the operation of the first and second modes of implementation of the present invention. Particular difference from the operation of the second embodied configuration of the present invention resides in that after information service use starts, that is, during communication with an arbitrary server (10), the service progress dependent information search unit (12) is started.

In addition to the effect obtained by the second embodied configuration of the present invention, according to the fourth embodied configuration of the present invention, the system which provides service for numbers of operation terminals (14) enables drastic reduction in loads on simultaneous processing in the server (10) because main units are provided in the operation terminal (14). In addition, data transmitted through the communication path (17) is reduced to mitigate traffic of the communication path.

A fifth embodied configuration of the present invention will be described.

Refer to the block diagram of the first embodied configuration of the present invention shown in FIG. 1. Components are the same as those of the block according to the first embodied configuration of the present invention. The block is formed of at least one server (10) for supplementing user operation and the operation terminal (14) used by a user for using information service with the communication paths (17, 18) provided therebetween.

The server (10) includes the service progress dependent information storage unit (11), the service progress dependent information search unit (12) and the service progress dependent information answering unit (13) for each group composed of at least one user.

The operation terminal (14) includes the service contents acquisition unit (15) and the operation information supplement instructing unit (16).

Entire operation of the present embodied configuration is equivalent to the operation of the first embodied configuration shown in FIG. 2 and FIG. 3. Particular difference from the operation of the first embodied configuration of the present invention resides in that the server (10) obtains terminal information from the operation terminal (14) to selectively use the service progress dependent information storage unit (11), the service progress dependent information search unit (12) and the service progress dependent information answering unit (13) to be operated based on a terminal identifier or a user identifier included in the terminal information.

For each group composed of at least one user, the server (10) to be used may be changed. In this case, when using service for the first time, the service progress dependent information search unit (12) decides a server to be used and notifies the operation terminal (14) of a server identifier for identifying the server (10) to be used later. The operation terminal (14) designates a communication destination according to the obtained server identifier. Such a distribution device capable of distributing a user access to a plurality of servers (10) as a load balancer provided between a plurality of servers (10) and the operation terminal (14) may have a table with terminal information and a server identifier paired.

In addition to the effect obtained by the first embodied configuration of the present invention, according to the fifth embodied configuration of the present invention, since each user includes a processing unit, a system having a distribution function or a distribution device can be structured with a plurality of servers (10) to reduce load on concentrated processing at one server (10) and traffic of a connected communication path when one server (10) executes concentrated processing.

EMBODIMENTS

Next, description will be made of specific embodiments.

A first embodiment of the present invention is a system as an application of the present invention to Internet shopping by using a personal computer.

Figure 9:
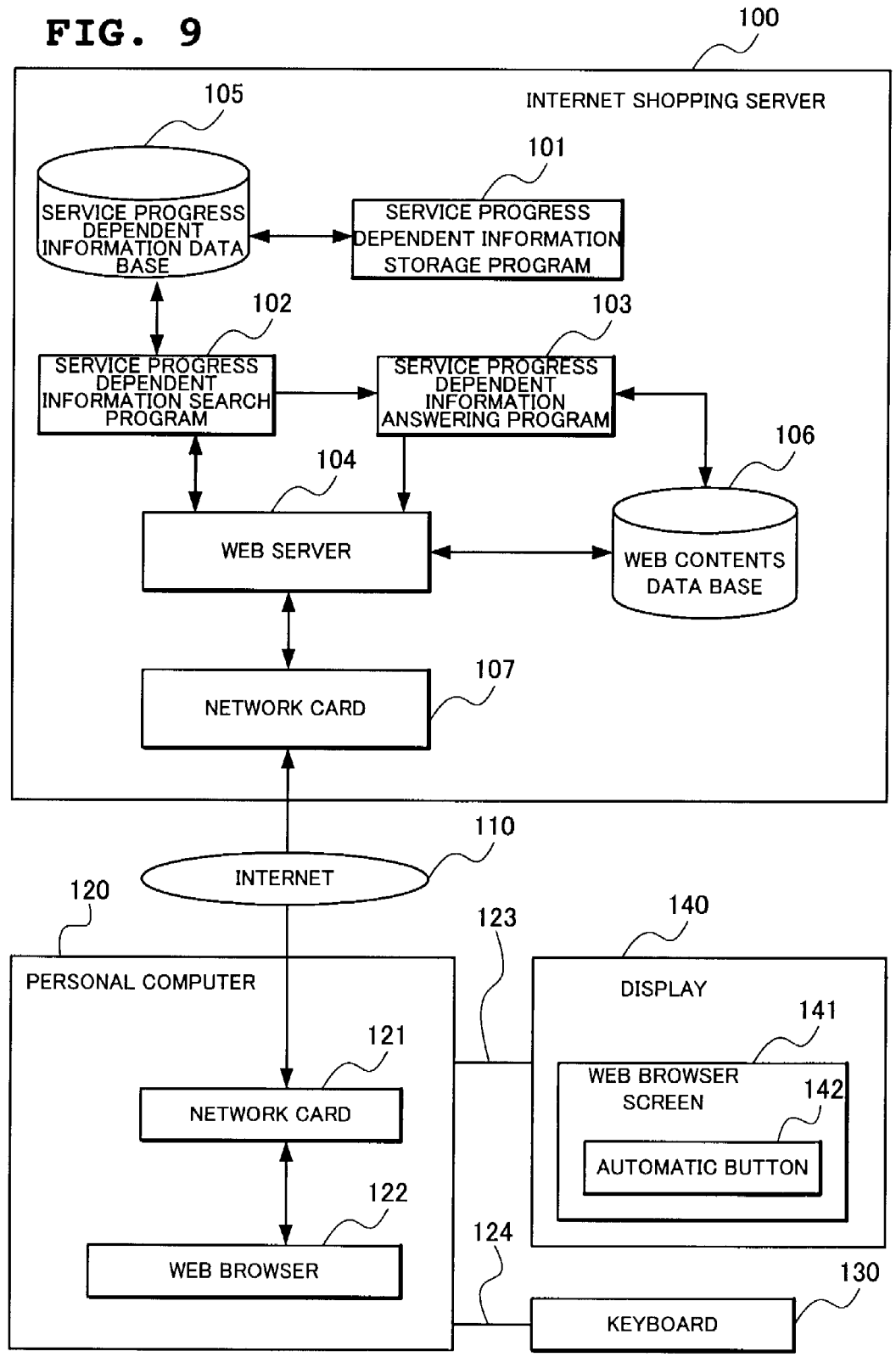
FIG. 9 is a block diagram showing structure of a first embodiment.
Figure 12:
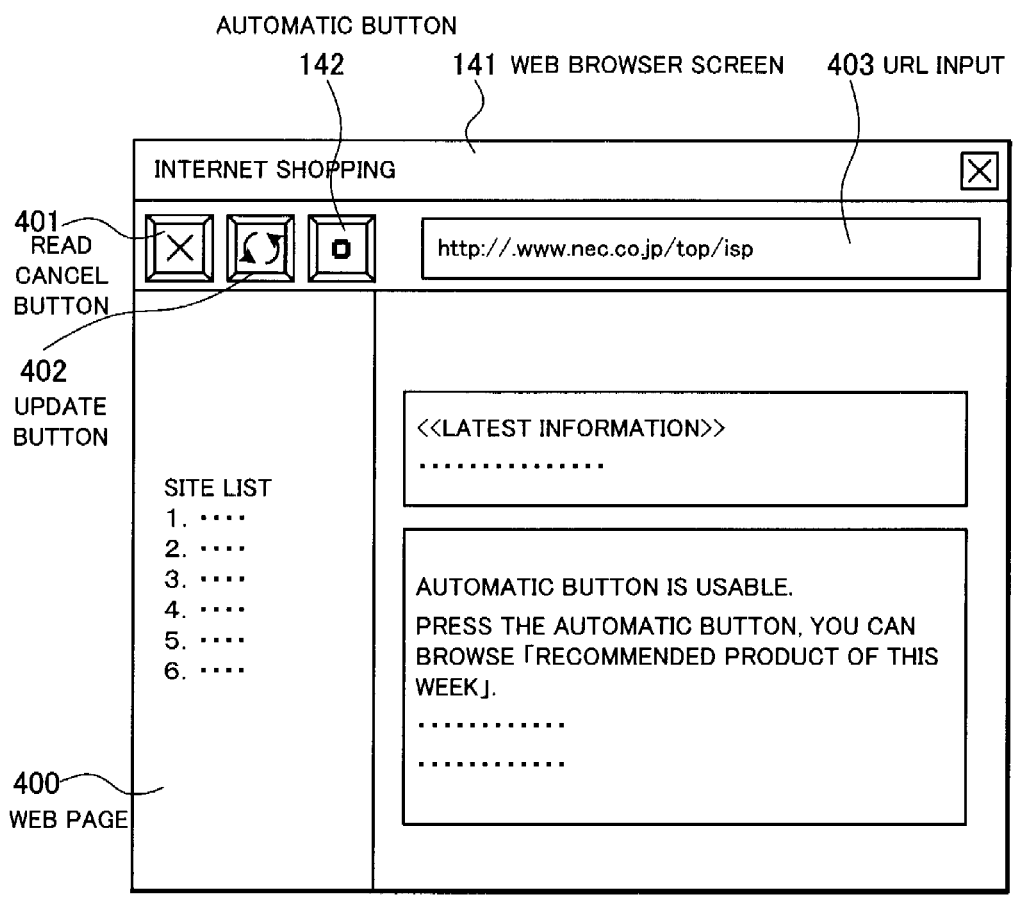
FIG. 12 is a diagram showing one example of a Web browser screen in the first embodiment.

FIG. 9 is a block diagram showing structure of a first embodiment. FIG. 12 shows one example of a Web browser screen (141).

With reference to FIG. 9, an Internet shopping server (100) is mounted on a server computer such as a workstation. The internet shopping server (100) includes a service progress dependent information storage program (101), a service progress dependent information search program (102), a service progress dependent information answering program (103), a Web server (104), a service progress dependent information data base (105), a Web contents data base (106) and a network card (107) adapted to Ethernet (registered trademark), which is connected to an Internet (110) through the network card (107).

A personal computer (120) includes a network card (121) and a Web browser (122) (software for browsing Web contents), which is connected to the Internet (110) through the network card (121). The personal computer (120) and a display (140) are connected by a display cable (123). The display (140) displays the Web browser screen (141).

While on the Web browser screen (141), a button (401) for canceling read of a Web page (400) and a button (402) for updating the Web page (400) are ordinarily prepared, in the present embodiment, an "automatic button" (142) instructing on operation supplement is prepared. On the Web browser screen (141), a URL input area (403) is provided to have a region for displaying the Web page (400). The personal computer (120) and a keyboard (130) are connected by a USB cable (124).

It is assumed that in each program, data and data base on the Internet shopping server (100) or the personal computer (120) are physically stored in a hard disk (not shown) which is provided in each computer and transferred from a CPU (not shown) provided in the server computer or the personal computer (120) to a memory (not shown) and executed as required.

Figure 10:
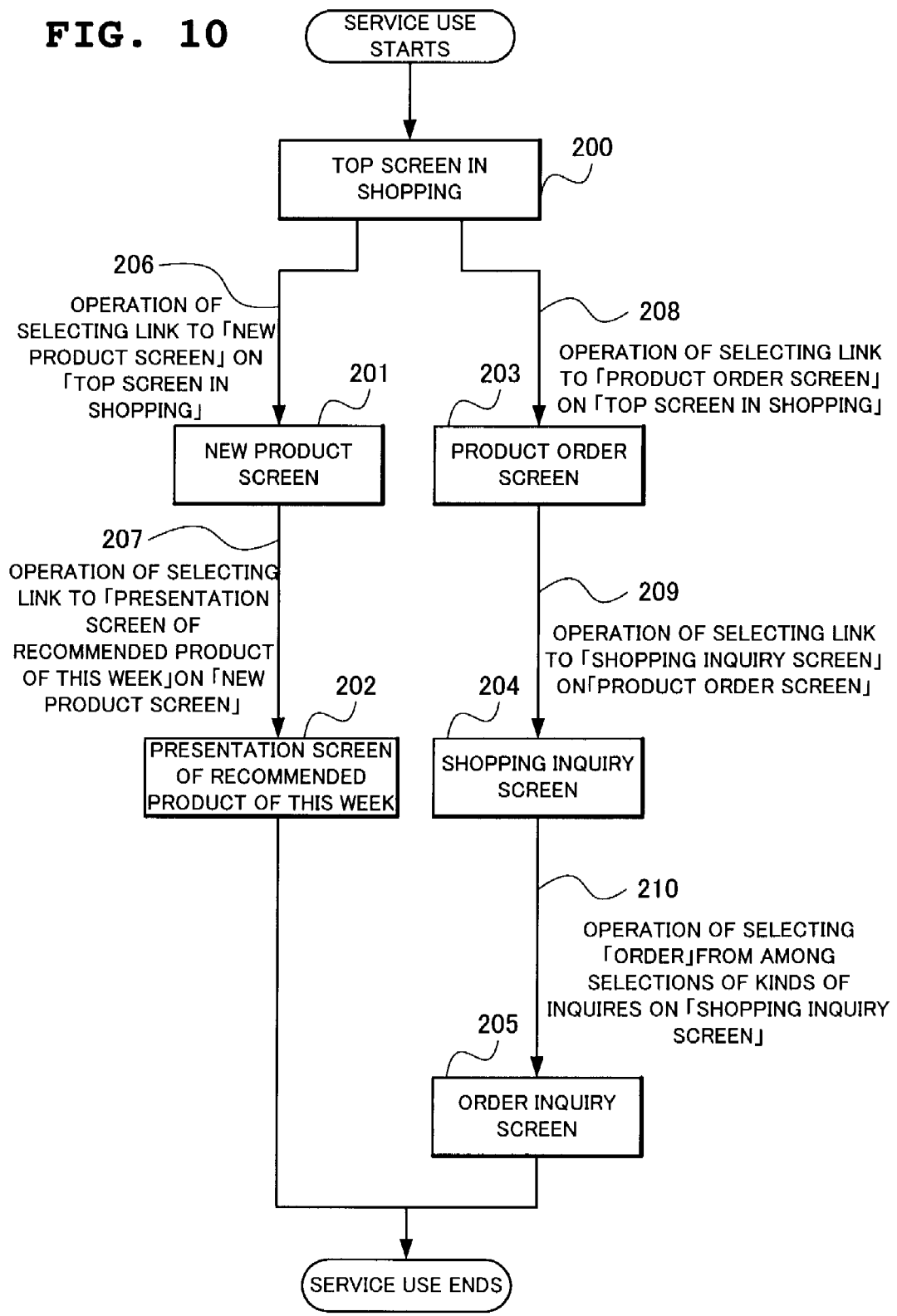
FIG. 10 is a transition diagram of a Web page responsively presented by an Internet shopping server to a personal computer in the first embodiment.

FIG. 10 is a diagram showing transition of a Web page responsively presented to the personal computer (120) by the service progress dependent information answering program (103) in the Internet shopping server (100). [Top screen in shopping] (200), [new product screen] (201), [presentation screen of recommended product of this week] (202), [product order screen] (203), [shopping inquiry screen] (204) and [order inquiry screen] (205) are Web pages. Next, description will be made of a flow of the transition of each Web page.

On the [top screen in shopping] (200), when "operation of selecting a link to the [new product screen] (201) on the [top screen in shopping] (200)" (206) is executed, the screen shifts to the [new product screen] (201).

On the [new product screen] (201), when "operation of selecting a link to the [presentation screen of recommended product of this week] (202) on the [new product screen] (201)" (207) is executed, the screen shifts to the [presentation screen of recommended product of this week] (202).

On the [top screen in shopping] (200), when "operation of selecting a link to the [product order screen] (203) on the [top screen in shopping] (200)" is executed, the screen shifts to the [product order screen] (203).

On the [product order screen] (203), when "operation of selecting a link to the [shopping inquiry screen] (204) on the [product order screen] (203)" (209) is executed, the screen shifts to the [shopping inquiry screen] (204).

On the [shipping inquiry screen] (204), when "operation of selecting [order] from among selections of various kinds of inquiries on the [shopping inquiry screen] (204)" is executed, the screen shifts to the [order inquiry screen] (205).

First, description will be made of operation of registering supplemental contents at the service progress dependent information data base (105) in advance.

A manager of the Internet shopping server (100) activates the service progress dependent information storage program (101) to register supplemental contents (service progress and operation information) at the service progress dependent information data base (105) in advance.

Service progress of the Internet shopping server (100) and operation information to be supplemented in the service progress are registered as a pair at the service progress dependent information data base (105). At this time the service progress dependent information storage program (101) assigns a unitary index to each paired supplemental contents in the data base.

Figure 11:
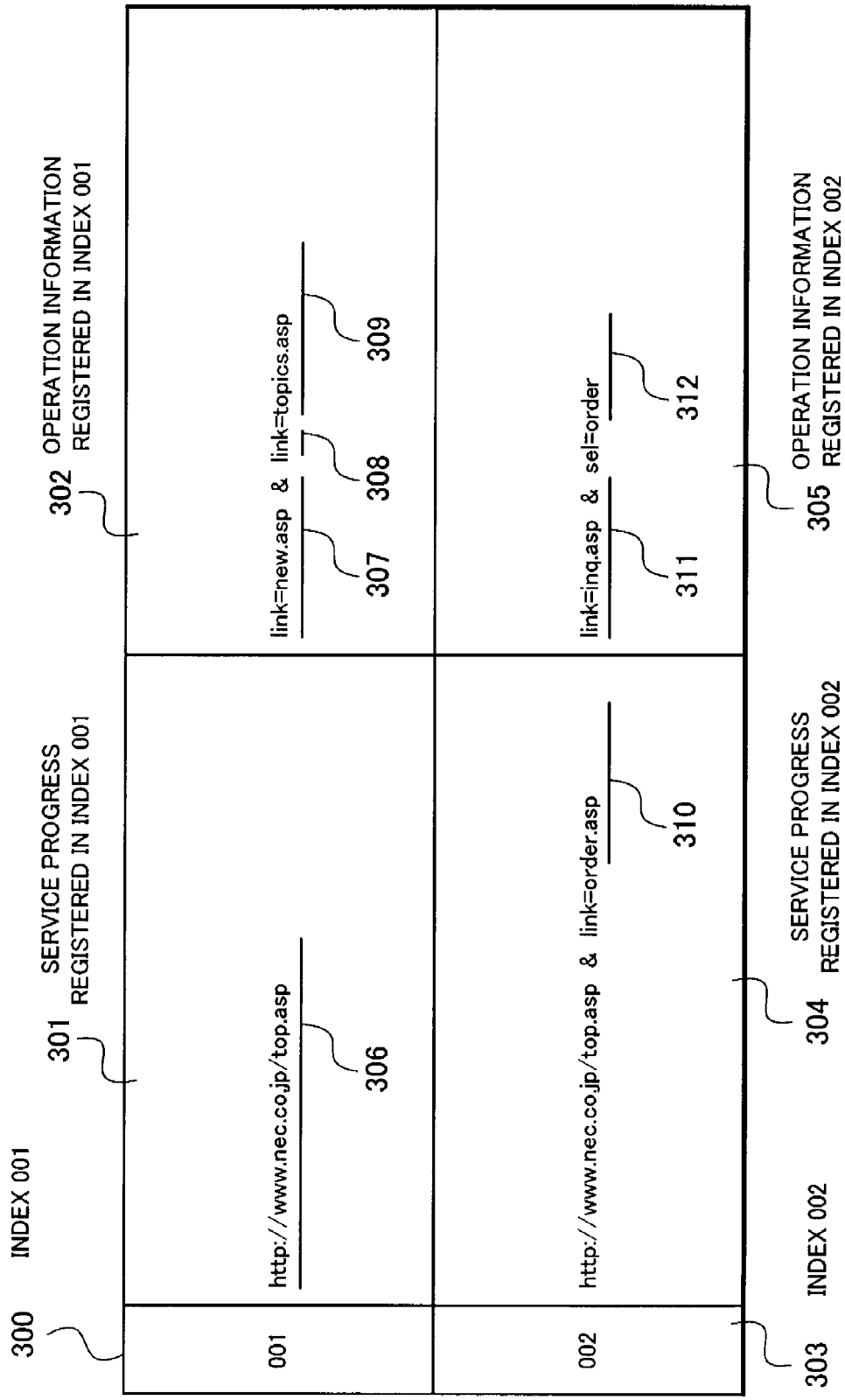
FIG. 11 is a diagram showing one example of a data format in a service progress dependent information data base in the first embodiment.

FIG. 11 shows one example of a data format in the service progress dependent information data base (105).

With reference to FIG. 11, to an index 001 (300), [001] is assigned and to an index 002 (303), [002] is assigned.

At a service progress (301) registered in the index 001, a URL (306) of the [top screen in shopping] (200) is registered.

Registered in operation information (302) registered in the index 001 is such operation information as "selecting a link to the new product screen (201) on the top screen in shopping (200) and further selecting a link to the presentation screen of recommended product of this week (202) on the new product screen (201)".

More specifically, operation data (307) represents "operation of selecting a link to the [new product screen] (201) on the [top screen in shopping] (200)" (206).

Operation data (309) represents "operation of selecting a link to the [presentation screen of recommended product of this week] (202) on the [new product screen] (201)" (207).

Operation data (308) denotes continuous execution of the operation data (307) and the operation data (309).

Registered in a service progress (304) registered in the index 002 are a URL and operation information to reach the [product order screen] (203) from the [top screen in shopping] (200). More specifically, it is described with the operation data (306), operation data (310) and operation data (311), with the operation data (306) being the URL (306) of the [top screen in shopping] (200) and the operation data (310) representing the "operation of selecting a link to the [product order screen] (203) on the [top screen in shopping] (200)" (208).

Registered in operation information (305) registered in the index 002 is such operation information as "selecting a link to the [shopping inquiry screen] (204) on the [product order screen] (203) and selecting [order] from selections of kinds of inquiries on the [shopping inquiry screen] (204)".

More specifically, the operation data (311) represents "operation of selecting a link to the [shopping inquiry screen] (204) on the [product order screen] (203)" (209). Operation data (312) represents "operation of selecting the [order] from among selections of kinds of inquires on the [shopping inquiry screen] (204)" (210).

Next, description will be made of operation, at the Internet shopping server (100), of determining a current service progress executed by a user who uses the personal computer (120).

The user inputs a URL which designates the [top screen in shopping] (200) presented by the Internet shopping server (100) (hereinafter referred to as URL[1]) in the URL input area (403) on the Web browser screen (141) by using the keyboard (130). The operation on the keyboard (130) is notified to the Web browser (122) through the USB cable (124), and the Web browser (122) reflects operation contents on the Web browser screen (141) through the display cable (123).

After entering the URL[1], when the user presses an enter (return) key by using the keyboard (130), the Web browser (122) obtains Web contents request information (including URL[1]) from the Web browser screen (141). Furthermore, the Web browser (122) transmits the Web contents request information to the Web server (104) through the Internet (110).

The Web server (104) having obtained the Web contents request information from the personal computer (120) transfers the URL[1] entered by the user to the service progress dependent information search program (102). When the Web contents request information here has a terminal identifier added for identifying the personal computer (120), the terminal identifier is also transferred to the service progress dependent information search program (102). The service progress dependent information search program (102) temporarily holds a pair of the URL[1] indicative of a service progress and a terminal identifier as "current service progress information" in a memory or the like. When no terminal identifier is added to then obtained Web contents request information, the service progress dependent information search program (102) assigns a new terminal identifier.

The service progress dependent information search program (102) returns the assigned terminal identifier to the Web server (104). When none of a new terminal identifier is assigned by the service progress dependent information search program (102), processing is shifted to the Web server (104) with no information added.

Between the Web server (104) and the Web browser screen (141), communication is executed by using HTTP (Hypertext Transfer Protocol) and the Web server (104) transmits the Web contents with an HTTP header (including HTTP expansion header) added thereto to the Web browser screen (141).

The Web server (104) includes the terminal identifier obtained from the service progress dependent information search program (102) into the HTTP expansion header and obtains Web contents indicative of the ⌈top screen in shopping⌋ (200) from the Web contents data base (106) to transmit the Web contents and the HTTP header to the Web browser (122).

The Web browser (122) having obtained the Web contents indicative of the ⌈top screen in shopping⌋ (200) renders the Web contents to display the ⌈top screen in shopping⌋ (200) on the Web browser screen (141).

The Web browser (122) describes the terminal identifier included in the obtained HTTP header into a terminal identifier file. The terminal identifier file is preserved in a hard disk provided in the personal computer (120).

When the HTTP communication is maintained between the Web server (104) and the Web browser (122), the terminal identifier may be temporarily held in a memory or the like at the Web server (104).

Next, description will be made of operation of pressing the automatic button (142) by a user to supplement operation information by the service progress dependent information answering program (103).

When the user presses the automatic button (142) while browsing the ⌈top screen in shopping⌋ (200) on the Web browser screen (141), the Web browser (122) senses the automatic button (142) being pressed to obtain a terminal identifier from the terminal identifier file. Next, through the Internet (110), the Web browser (122) transmits supplement request information (which denotes that operation supplement is instructed by a user and which includes the terminal identifier in question) to the Web server (104). The Web server (104) transfers the supplement request information to the service progress dependent information search program (102).

Based on the terminal identifier contained in the obtained supplement request information, the service progress dependent information search program (102) obtains a current service progress recorded as a pair with the terminal identifier from the current service information. The service progress dependent information search program (102) searches a service progress recorded in the service progress dependent information data base (105) based on the current service progress to obtain operation information recorded as a pair with the current service progress.

The service progress dependent information search program (102) transfers the current service progress obtained by the search, the operation information (which is here the operation information (302) registered at the index 001 because the user browses the ⌈top screen in shopping⌋ (200)) and the terminal identifier obtained from the personal computer (120) to the service progress dependent information answering program (103).

With the current service progress (⌈top screen in shopping⌋ (200)) as a start point, the service progress dependent information answering program (103) vicariously executes operation of the operation information (the operation information (302) registered at the index 001) to supplement user operation to reach the ⌈presentation screen of recommended product of this week⌋ (202). Web contents representing the ⌈presentation screen of recommended product of this week⌋ (202) which is obtained as a result of the supplement is transferred to the Web server (104). When the service progress dependent information answering program (103) supplements user operation, the Web contents data base (106) will be referred to as required when data of the Web contents is required such as in a case of operating a Web page obtained by tracing a link in a Web page.

Upon obtaining the Web contents representing the ⌈presentation screen of recommended product of this week⌋ (202) from the service progress dependent information answering program (103), the Web server (104) transmits the Web contents to the Web browser (122). The Web browser (122) renders the obtained Web contents and displays the rendered Web contents by the Web browser screen (141).

Next, description will be made of operation executed in a case where the user presses the automatic button (142) when the ⌈new product screen⌋ (201) is displayed.

First, when the user selects a link to the ⌈new product screen⌋ (201) in the ⌈top screen in shopping⌋ (200) by the Web browser screen (141), the Web browser (122) transmits information of a link to the ⌈new product screen⌋ (201) and the terminal identifier obtained from the terminal identifier file as Web contents request information to the Web server (104).

Upon obtaining the Web contents request information from the Web server (104), the service progress dependent information search program (102) obtains a current service progress recorded in pair with the terminal identifier from the current service progress information held in the memory. The service progress dependent information search program (102) furthermore adds link information contained in the Web contents request information to the current service progress to update the current service progress of the current service progress information.

Next, when the user presses the automatic button (142) while the new product screen is displayed, the Web browser (122) transmits supplement request information containing the terminal identifier obtained from the terminal identifier file to the Web server (104). The Web server (104) transfers the above supplement request information to the service progress dependent information search program (102).

The service progress dependent information search program (102) obtains a current service progress recorded in pair with the terminal identifier contained in the supplement request information from the current service information.

The service progress dependent information search program (102) furthermore searches whether the current service progress (which is here a service progress indicative of the ⌈new product screen⌋ (201) because the ⌈new product screen⌋ (201) is being browsed) is included in the transition from a service progress recorded in the service progress dependent information data base (105) to a service progress reached as a result of supplement by the operation information paired with the service progress.

More specifically, because the ⌈new product screen⌋ (201) can be browsed after the execution of the operation data (307), the service progress indicative of the ⌈new product screen⌋ (201) is included during the execution of the operation information (302) registered in the index 001 with the service progress (301) registered at the index 001 as a start point.

Therefore, because the service progress indicative of the [new product screen] (201) is included from the service progress (301) registered at the index 001 to the service progress reached as a result of supplement by the operation information (302) registered in the index 001, the service progress dependent information search program (102) obtains operation data as of after the service progress indicative of the [new product screen] (201), that is, the operation data (309).

The service progress dependent information search program (102) transfers the current service progress, the obtained operation data (309) and the terminal identifier obtained from the personal computer (120) to the service progress dependent information answering program (103).

The service progress dependent information answering program (103) vicariously executes user operation by using the operation data (309) with the service progress indicative of the [new product screen] (201) as a start point to transfer the Web contents indicative of the [presentation screen of recommended product of this week] (202) obtained as a result of the vicarious execution to the Web server (104).

The Web server (104) transmits the obtained Web contents indicative of the [presentation screen of recommended product of this week] (202) to the Web browser (122).

The Web server (122) renders the Web contents indicative of the [presentation screen of recommended product of this week] (202) to display the [presentation screen of recommended product of this week] (202) on the Web browser screen (141).

Next, description will be made of operation of supplementing user operation executed from the [product order screen] (203) to the [order inquiry screen] (205). As to operation similar to the above-described operation of supplementing operation, no detailed description thereof will be made.

When the user displays the [product order screen] (203) on the Web browser screen (141), the Web browser (122) transmits information of a link to the [product order screen] (203) and the terminal identifier obtained from the terminal identifier file as Web contents request information to the Web server (104).

The Web server (104) having obtained the Web contents request information transfers the same to the service progress dependent information search program (102).

The service progress dependent information search program (102) obtains a current service progress recorded in pair with the terminal identifier contained in the Web contents request information from the current service progress information and based on the obtained current service progress, obtains operation information recorded as a pair with the current service progress from the service progress dependent information data base (105).

The service progress dependent information search program (102) transfers the current service progress obtained as a result of the search, the operation information (which is here the operation information (305) registered in the index 002 because the user browses the [product order screen] (203)) and the terminal identifier obtained from the personal computer (120) to the service progress dependent information answering program (103).

The service progress dependent information answering program (103) supplements user operation to reach the [order inquiry screen] (205) by vicariously executing operation of the above operation information (the operation information (305) registered in the index 002) with the current service progress ([product order screen] (203)) as a start point. The Web contents indicative of the [order inquiry screen] (205) obtained as a result of the supplement are transferred to the Web server (104).

Upon obtaining the Web contents indicative of the [order inquiry screen] (205) from the service progress dependent information answering program (103), the Web server (104) transmits the Web contents to the Web browser (122).

The Web browser (122) renders the obtained Web contents to display the rendered Web contents on the Web browser screen (141).

The automatic button (142) may be displayed on the display (140) by such an external program as another Web browser different from the Web browser screen (141). The automatic button (142) may be assigned to a specific button provided in the key board (130) attached to the personal computer (120). In any case, the personal computer (120) notifies the Internet shopping server (100) through the Web browser (122) that the automatic button (142) is used.

The personal computer (120) may be other communication apparatus such as a telephone set, a portable information apparatus or a television set.

As described in the foregoing, by recording operation information in a service progress and the service progress in pair in the service progress dependent information data base (105) by the Internet shopping server (100) and according to a service progress of the user, that is, a Web page being browsed by the Web browser (141), vicariously executing user operation in the Web page being browsed based on the operation information recorded in the service progress dependent information data base (105), the manager of the Internet shopping server (100) or the user is allowed to proceed to an arbitrary Web page he or she desires.

Second embodiment of the present invention is application of the present invention to a system for doing Internet shopping by using a telephone set.

Figure 13:
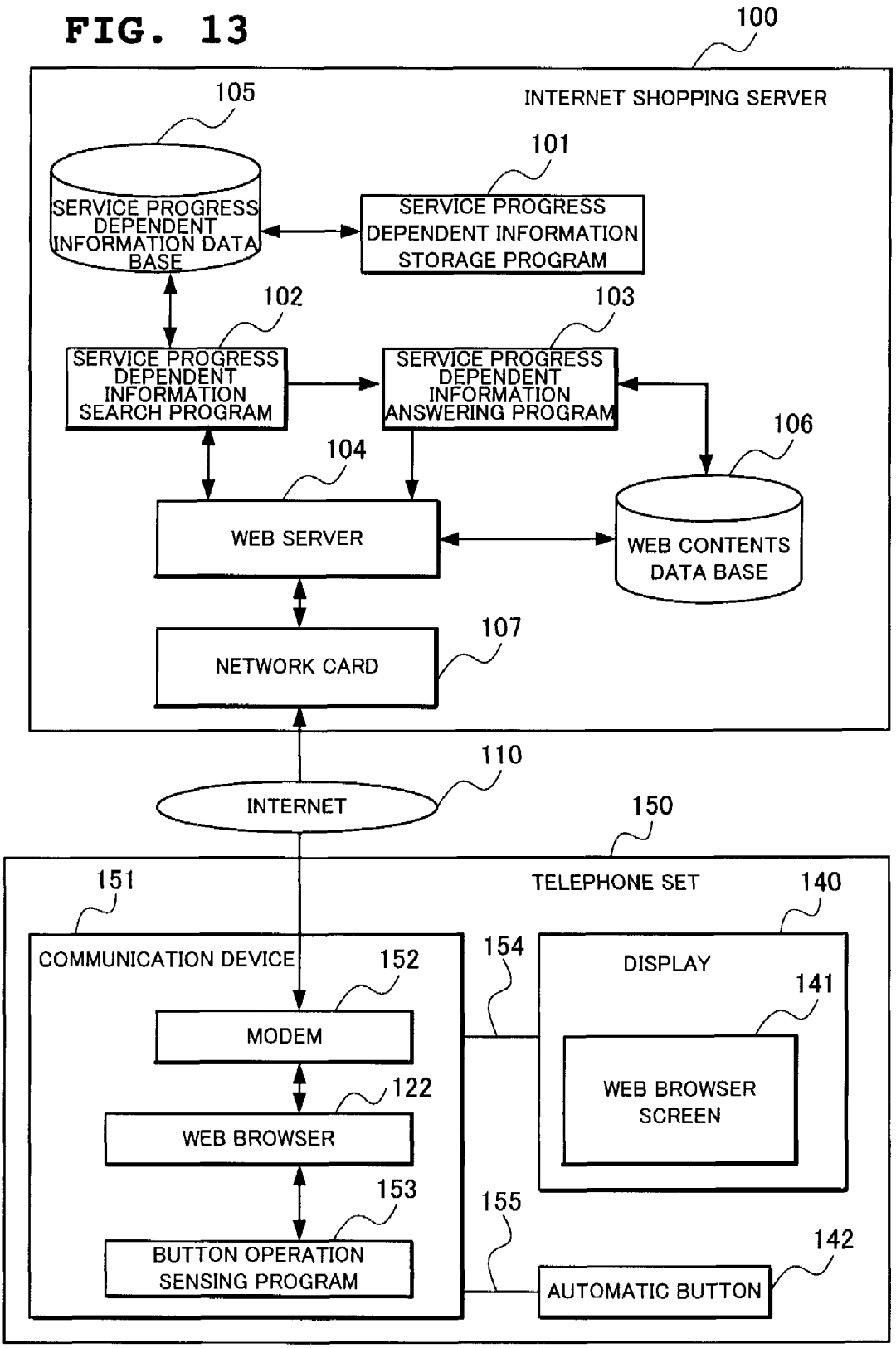
FIG. 13 is a block diagram showing structure of a second embodiment.
Figure 16:
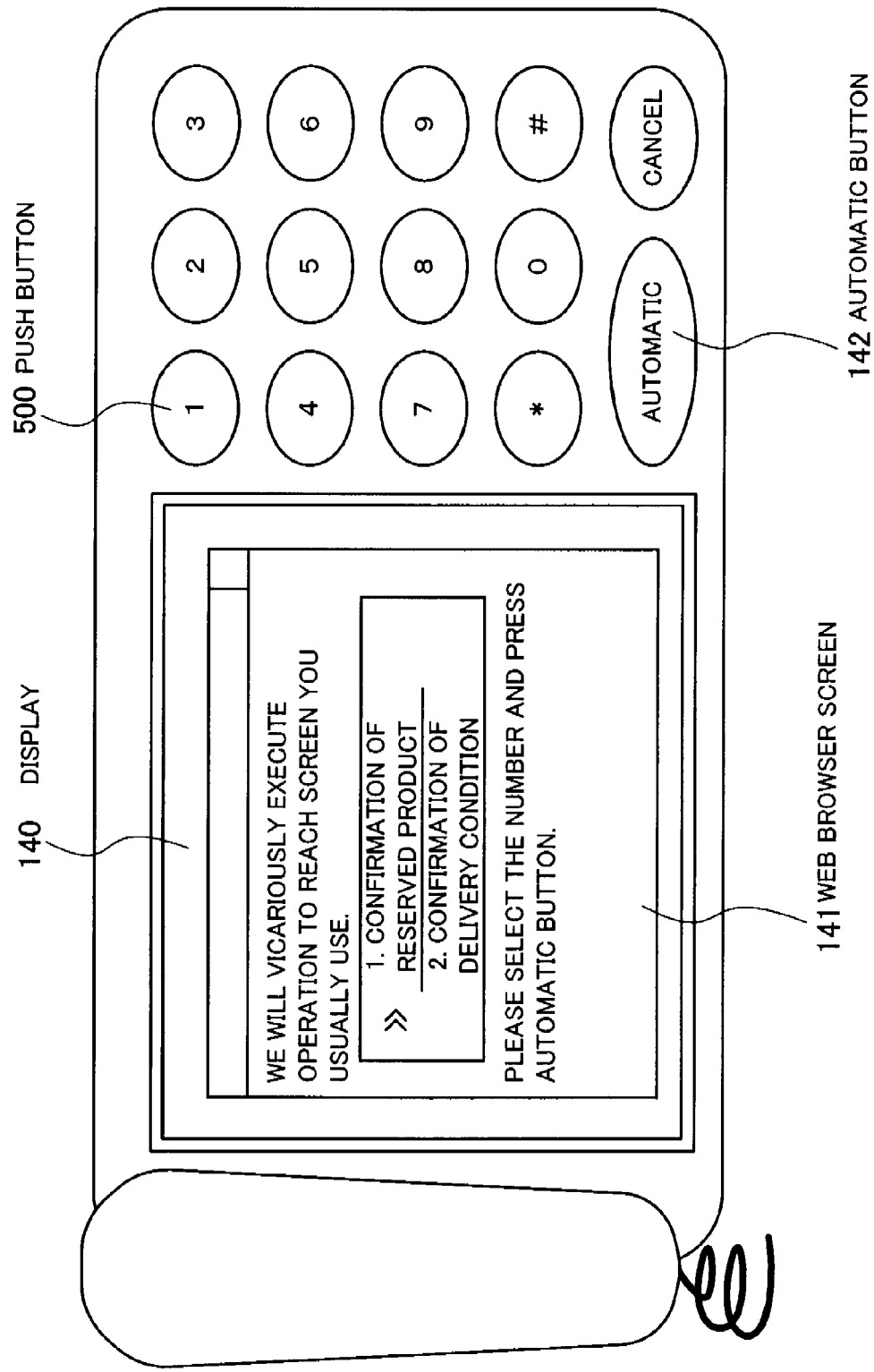
FIG. 16 is a diagram showing one example of a Web browser screen in the second embodiment.

FIG. 13 is a block diagram showing structure of the second embodiment. FIG. 16 shows one example of a screen of a telephone set (150).

The Internet shopping server (100) is mounted on a server computer such as a workstation. The Internet shopping server (100) includes the service progress dependent information storage program (101), the service progress dependent information search program (102), the service progress dependent information answering program (103), the Web server (104), the service progress dependent information data base (105), the Web contents data base (106) and the network card (107) adapted to Ethernet (registered trademark), which is connected to the Internet (110) through the network card (107).

The telephone set (150) includes a communication device (151), the display (140) and the automatic button (142). The communication device (151) includes a modem (152), the Web browser (122) and a button operation sensing program (153), which is connected to the Internet (110) through the modem (152). In addition, the communication device (151) and the display (140) are connected by a dedicated wiring (154) for a display, and the display (140) displays the Web browser screen (141). In general, a push button (500) is disposed in a telephone set, while in the present embodiment, the [automatic button] (142) is prepared for instructing on operation supplement. The automatic button (142) and the communication device (151) are connected by a dedicated wiring (155) for an automatic button.

It is assumed that each program, data and data base on the Internet shopping server (100) or the communication device (151) are physically stored in a hard disk (not shown) which is provided in the Internet shopping server (100) or the communication device (151) and transferred from a CPU (not shown) provided in the communication device (151) to a memory (not shown) and executed as required.

Figure 14:
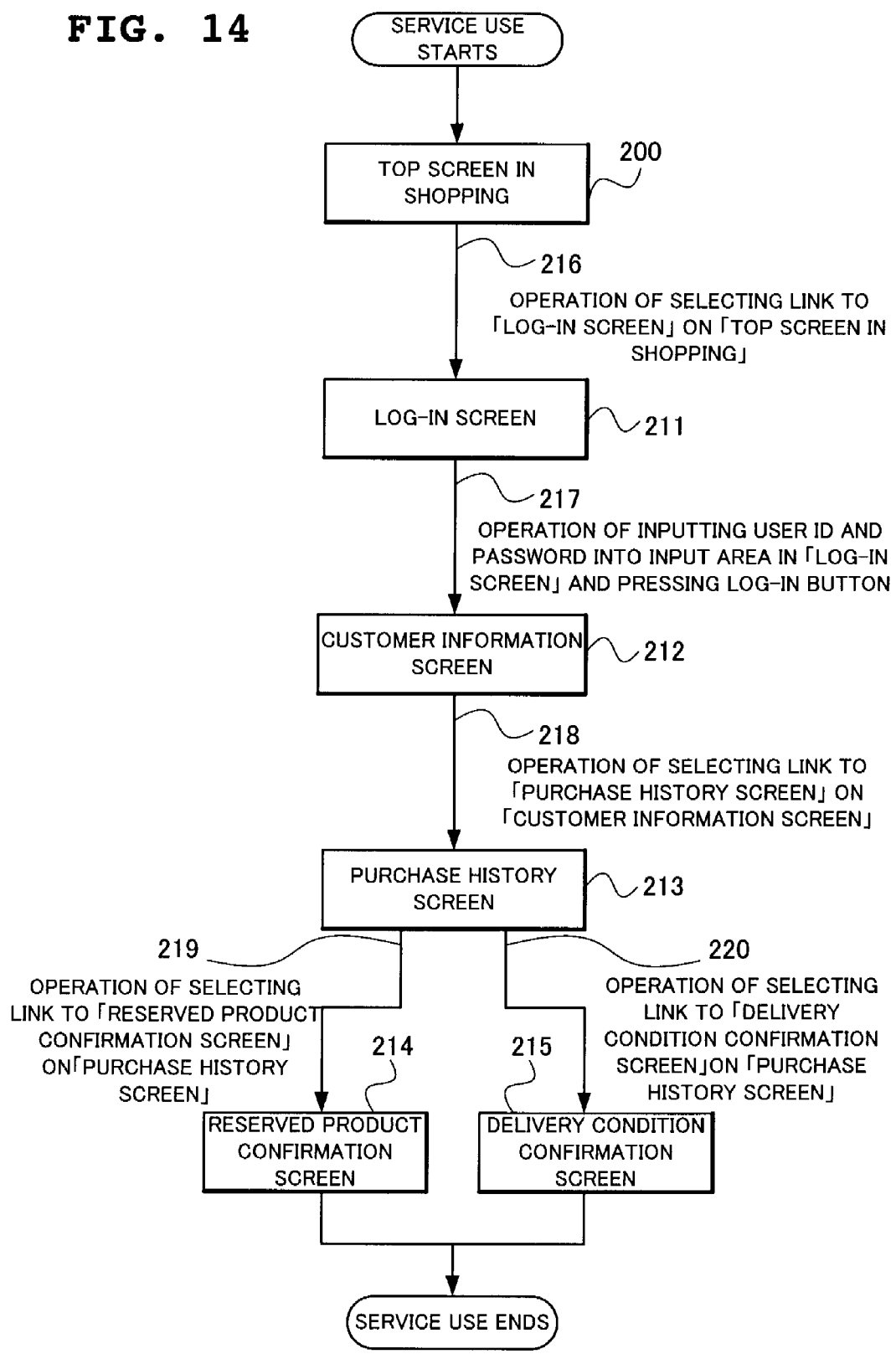
FIG. 14 is a transition diagram of a Web page responsively presented by an Internet shopping server to a telephone set in the second embodiment.

FIG. 14 is a diagram showing transition of a Web page responsively presented to the telephone set (150) by the service progress dependent information answering program (103) in the Internet shopping server (100). ⌈Top screen in shopping⌋ (200), ⌈log-in screen⌋ (211), ⌈customer information screen⌋ (212), ⌈purchase history screen⌋ (213), ⌈reserved product confirmation screen⌋ (214) and ⌈delivery condition confirmation screen⌋ (215) are Web pages. Next, description will be made of a flow of the transition of each Web page.

On the ⌈top screen in shopping⌋ (200), upon execution of "operation of selecting a link to the ⌈log-in screen⌋ (211) on the ⌈top screen in shopping⌋ (200)" (216), transition is made to the ⌈log-in screen⌋ (211).

On the ⌈log-in screen⌋ (211), upon execution of "operation of inputting a user ID and a password into an input area on the ⌈log-in screen⌋ (211) and pressing a log-in button" (217), transition is made to the ⌈customer information screen⌋ (212).

On the ⌈customer information screen⌋ (212), upon execution of "operation of selecting a link to the ⌈purchase history screen⌋ (213) on the ⌈customer information screen⌋ (212)" (218), transition is made to the ⌈purchase history screen⌋ (213).

On the ⌈purchase history screen⌋ (213), upon execution of "operation of selecting a link to the ⌈reserved product confirmation screen⌋ (214) on the ⌈purchase history screen⌋ (213)" (219), transition is made to the ⌈reserved product confirmation screen⌋ (214).

On the ⌈purchase history screen⌋ (213), upon execution of "operation of selecting a link to the ⌈delivery condition confirmation screen⌋ (215) on the ⌈purchase history screen⌋ (213)" (220), transition is made to the ⌈delivery condition confirmation screen⌋ (215).

In addition to the operation according to the first embodiment, the second embodiment additionally has a function of registering, during the information service use, user operation at the service progress dependent information data base (105) and a function of selecting operation to be supplemented from among a plurality of supplement candidates in a certain service progress.

First, description will be made of operation executed until instructing on registration start in order to register, in the service progress dependent information data base (105), contents to be operated by a user during the use of information service as supplemental contents.

It is premised that the telephone set (150) has a terminal identifier for identifying the telephone set (150) assigned and has a "terminal identification file" which records the terminal identifier (e.g. "1234") (see the first embodiment with respect to a terminal identifier assignment method). A CPU (not shown) provided in the communication device (151) holds data of an Internet menu which can be used by a user.

While browsing the Web browser screen (141) displayed on the display (140) of the telephone set (150), the user selects a menu for accessing the top screen (200) of the Internet shopping system (the content of the menu is a URL which designates the ⌈top screen in shopping⌋ (200), which will be denoted as ⌈URL[1]⌋ hereafter) from the above Internet menu by using the push button (500) which the telephone set (150) has.

When the user selects the above menu, the Web browser (122) obtains the Web contents request information (including URL[1]) from the Web browser screen (141).

The Web browser (122) further transmits the Web contents request information with the terminal identifier obtained from the terminal identifier file added to the Web server (104) through the Internet (110).

The Web server (104) having obtained the Web contents request information from the telephone set (150) transfers the URL[1] contained in the Web contents request information and the terminal identifier to the service progress dependent information search program (102).

The service progress dependent information search program (102) temporarily holds the pair of the URL[1] indicative of a service progress and the terminal identifier as "current service progress information" in a memory or the like.

When the user selects a link to the ⌈log-in screen⌋ (211) on the ⌈top screen in shopping⌋ (200), the Web browser (122) obtains a terminal identifier from the terminal identifier file to transmit information of the link to the ⌈log-in screen⌋ (211) and the terminal identifier to the service progress dependent information search program (102) through the Web server (104).

The service progress dependent information search program (102) searches the current service progress information for the above terminal identifier to update a current service progress recorded as a pair with the terminal identifier to a service progress indicative of the ⌈log-in screen⌋ (211).

For registering user operation as of after the ⌈log-in screen⌋ (211), the user presses the automatic button (142) when the ⌈log-in screen⌋ (211) is being displayed.

When sensing that the user presses the automatic button (142) through the dedicated wiring (155) for an automatic button, the button operation sensing program (153) determines whether the instruction made at that time is:
  an instruction to start recording of operation information or
  an instruction to register operation information in the service progress dependent information data base (105).

When the automatic button (142) is pressed for the first time after the communication device (151) starts communication with the Internet shopping server (100), the determination will be that it is an instruction to start recording of operation information, so that the button operation sensing program (153) temporarily holds "automatic button instruction information" which records the instruction to start recording of operation information in a memory or the like.

Next time when the automatic button (142) is pressed, the button operation sensing program (153) checks whether the last automatic button instruction information is:
  "an instruction to start recording of operation information"
    or
  "an instruction to register operation information".

When the last automatic button instruction information is the "instruction to start recording of operation information", determination is made that this pressing of the automatic button (142) is to instruct on registering of operation information in the service progress dependent information data base (105) to record the instruction to register operation information in the "automatic button instruction information".

When the last automatic button instruction information is the "instruction to register operation information", determination is made that this pressing of the automatic button (142) is to instruct on starting of recording of operation information to record the instruction to start recording of operation information in the "automatic button instruction information".

Since the user presses the automatic button (142) for the first time when browsing the ⌈log-in screen⌋ (211), the button operation sensing program (153) records the instruction to start recording of operation information in the "automatic button instruction information".

The button operation sensing program (153) furthermore instructs the Web browser (122) to accumulate user operation.

The Web browser (122) having been instructed to accumulate user operation by the button operation sensing program (153) obtains a terminal identifier from the terminal identifier file and transmits the "operation information start request information" including the terminal identifier to the Web server (104) through the Internet (110).

Upon receiving the operation information start request information from the Web browser (122), the Web server (104) transfers the operation information start request information to the service progress dependent information search program (102). The service progress dependent information search program (102) having obtained the operation information start request information obtains a current service progress (which is here a service progress indicative of the ⌈log-in screen⌋ (211) because the user is browsing the ⌈log-in screen⌋ (211)) recorded as a pair with the terminal identifier contained in the operation information start request information from the current service progress information held by the service progress dependent information search program (102).

The service progress dependent information search program (102) temporarily holds "registration candidate service progress information" with the obtained current service progress and the terminal identifier contained in the operation information start request information as a pair in a memory of the service progress dependent information search program (102) or the like.

Next, description will be made of operation of registering, in the service progress dependent information data base (105), contents of operation executed at transition from the ⌈log-in screen⌋ (211) to the ⌈reserved product confirmation screen⌋ (214) as supplemental contents.

The user inputs a user ID and a password on the ⌈log-in screen⌋ (211) to select the log-in button and display the ⌈customer information screen⌋ (212) on the Web browser screen (141).

The user furthermore selects a link to the ⌈purchase history screen⌋ (213) on the ⌈customer information screen⌋ (212) to display the ⌈purchase history screen⌋ (213).

The user further selects a link to the ⌈reserved product confirmation screen⌋ (214) on the ⌈purchase history screen⌋ (213) to display the ⌈reserved product confirmation screen⌋ (214).

As described above, information (216, 217, 218, 219) about such operation as of entering a character string such as a user ID into the input area displayed on the Web browser screen (141) and tracing a link on the screen by a user at the time of transition from the ⌈log-in screen⌋ (211) to the ⌈reserved product confirmation screen⌋ (214) is accumulated in the Web browser (122).

The user presses the automatic button (142) when the ⌈reserved product confirmation screen⌋ (214) is displayed on the Web browser screen (141).

The button operation sensing program (153) senses pressing of the automatic button (142) by the user and confirms the "automatic button instruction information" to determine that the present pressing of the automatic button (142) is for an "instruction to register operation information".

The button operation sensing program (153) records an instruction to register operation information in the "automatic button instruction information" to instruct the Web browser (122) to register user operation.

The Web browser (122) having been instructed to register user operation by the button operation sensing program (153) obtains a terminal identifier from the terminal identifier file to transmit "operation information registration request information" including the terminal identifier and accumulated operation information to the Web server (104) through the Internet (110).

Upon receiving the operation information registration request information from the Web browser (122), the Web server (104) transfers the operation information registration request information to the service progress dependent information search program (102).

Based on the terminal identifier contained in the operation information registration request information, the service progress dependent information search program (102) obtains a registration candidate service progress (which is here a service progress indicative of the ⌈log-in screen⌋ (211)) preserved as a pair with the terminal identifier from the registration candidate service progress information and transfers the registration candidate service progress and the operation information registration request information obtained from the Web server (104) to the service progress dependent information storage program (101).

After confirming that supplemental contents with operation information and a terminal identifier contained in the operation information registration request information and the registration candidate service progress as a combination are no more registered in the service progress dependent information data base (105), the service progress dependent information storage program (101) newly assigns 003 as an index in the service progress dependent information data base (105) to record supplemental contents with the service progress, the terminal identifier and the operation information in combination.

FIG. 15 shows one example of a data format in the service progress dependent information data base (105).

To an index 003 (313) shown in FIG. 15, "003" is assigned.

As a terminal identifier (314) registered in the index 003, the above terminal identifier, that is, the terminal identifier "1234" assigned to the telephone set (150) is registered.

As a service progress (315) registered in the index 003, a URL and operation information for reaching the ⌈log-in screen⌋ (211) from the ⌈top screen in shopping⌋ (200) are registered.

More specifically, the service progress is described with operation data (306), operation data (308) and operation data (321), with the operation data (306) being URL of the ⌈top screen in shopping⌋ (200) and the operation data (321) representing "operation of selecting a link to the ⌈log-in screen⌋ (211)" (216). The operation data (308) denotes successive execution of the operation data (306) and the operation data (321).

As operation information (316) registered in the index 003, such operation information is registered of "inputting a user ID and a password to select the log-in button on the ⌈log-in screen⌋ (211), selecting a link to the ⌈purchase history screen⌋ (213) on the ⌈customer information screen⌋ (212) and selecting a link to the ⌈reserved product confirmation screen⌋ (214) on the ⌈purchase history screen⌋ (213)" which is accumulated in the button operation sensing program (153).

More specifically, operation data (322) represents "operation of inputting a user ID and a password into an input area on the ⌈log-in screen⌋ (211)" (217). Operation data (323) represents "operation of pressing the log-in button on the ⌈log-in screen⌋ (211)" (217).

Accordingly, the "operation of inputting a user ID and a password into an input area on the ⌈log-in screen⌋ (211) and pressing the log-in button" (217) can be vicariously executed by successive execution of the operation data (322) and the operation data (323).

Operation data (324) represents "operation of selecting a link to the ⌈purchase history screen⌋ (213) on the ⌈customer information screen⌋ (212)" (218). Operation data (325) represents "operation of selecting a link to the ⌈reserved product confirmation screen⌋ (214) on the ⌈purchase history screen⌋ (213)" (219).

Next, description will be made of operation of registering, in the service progress dependent information data base (105), the contents of operation executed when transition is made from the ⌈log-in screen⌋ (211) to the ⌈delivery condition confirmation screen⌋ (215) as supplemental contents.

As described above, when the ⌈log-in screen⌋ (211) is browsed, the automatic button (142) is pressed and the button operation sensing program (153) records an instruction to start recording of operation information in "automatic button instruction information".

The Web browser (122) starts accumulation of operation information to transmit "operation information start request information" including a terminal identifier obtained from the terminal identifier file to the Web server (104).

Upon obtaining the operation information start request information from the Web browser (122), the service progress dependent information search program (102) obtains, from the current service progress information, a current service progress recorded as a pair with the terminal identifier contained in the operation information start request information (which is here a service progress indicative of the ⌈log-in screen⌋ (211) because the user is browsing the ⌈log-in screen⌋ (211)). Furthermore, the service progress dependent information search program (102) temporarily holds "registration candidate service progress information" with the obtained current service progress and the terminal identifier contained in the operation information start request information paired in a memory of the service progress dependent information search program (102) or the like.

The user, similarly to the above, upon transition from the ⌈log-in screen⌋ (211) to the ⌈purchase history screen⌋ (213), selects a link to the ⌈delivery condition confirmation screen⌋ (215) on the ⌈purchase history screen⌋ (213) to display the ⌈delivery condition confirmation screen⌋ (215).

When the ⌈delivery condition confirmation screen⌋ (215) is displayed on the Web browser screen (141), the user presses the automatic button (142).

The button operation sensing program (153) senses the user pressing the automatic button (142) and confirms "automatic button instruction information" to determine that the pressing of the automatic button (142) this time is for the "instruction to register operation information". The button operation sensing program (153) records the instruction to register operation information in the "automatic button instruction information" to instruct the Web browser (122) to register user operation.

The Web browser (122) having been instructed to register user operation by the button operation sensing program (153) obtains a terminal identifier from the terminal identifier file to transmit the "operation information registration request information" including the terminal identifier and the accumulated operation information to the Web server (104) through the Internet (110).

Upon receiving the operation information registration request information from the Web browser (122), the Web server (104) transfers the operation information registration request information to the service progress dependent information search program (102).

Based on the terminal identifier contained in the operation information registration request information, the service progress dependent information search program (102) obtains a registration candidate service progress (service progress indicative of the ⌈log-in screen⌋ (211) here) preserved as a pair with the terminal identifier from the registration candidate service progress information to transfer the registration candidate service progress and the operation information registration request information obtained from the Web server (104) to the service progress dependent information storage program (101).

After confirming that supplemental contents with operation information and the terminal identifier contained in the operation information registration request information and the registration candidate service progress as a combination fail to be no more registered in the service progress dependent information data base (105), the service progress dependent information storage program (101) newly assigns 004 as an index in the service progress dependent information data base (105) and records supplemental contents with the service progress, the terminal identifier and the operation information as a combination.

To an index 004 (317) shown in FIG. 15, "004" is assigned.

As a terminal identifier (138) registered in the index 004, the above terminal identifier, that is, the terminal identifier "1234" assigned to the telephone set (150) is registered.

As an service progress (319) registered in the index 004, a URL and operation information to reach the ⌈log-in screen⌋ (211) from the ⌈top screen in shopping⌋ (200) are registered. Specific operation data is the same as that of the service progress (315) registered in the index 003.

Registered as operation information (320) in the index 004 is such operation information as "inputting a user ID and a password on the ⌈log-in screen⌋ (211) to select the log-in button, selecting a link to the ⌈purchase history screen⌋ (213) on the ⌈customer information screen⌋ (212) and selecting a link to the ⌈delivery condition confirmation screen⌋ (215) on the ⌈purchase history screen⌋ (213)" which is accumulated in the button operation sensing program (153).

More specifically, the "operation of inputting a user ID and a password on the ⌈log-in screen⌋ (211) to select the log-in button and selecting a link to the ⌈purchase history screen⌋ (213) on the ⌈customer information screen⌋ (212)" is represented by the operation data (322), the operation data (323) and the operation data (324) similarly to the operation information (316) registered in the index 003. Operation data (326) represents the "operation of selecting a link to the ⌈delivery condition confirmation screen⌋ (215) on the ⌈purchase history screen⌋ (213)" (220).

Next, description will be made of operation of selecting operation contents to be supplemented by a user from among a plurality of candidates for user operation to be supplemented and supplementing the selected user operation. As to a part to be operated similarly to the operation supplementing operation which has been described in the first embodiment, no detailed description will be made.

After registering the above user operation (contents of operation executed at the time of transition from the ⌈log-in screen⌋ (211) to the ⌈reserved product confirmation screen⌋ (214) and contents of operation executed at the time of transition from the ⌈log-in screen⌋ (211) to the ⌈delivery condition confirmation screen⌋ (215)) at the service progress dependent information data base (105), when the ⌈log-in screen⌋ (211) is displayed on the Web browser screen (141), the Web browser (122) transmits information of a link to the ⌈log-in screen⌋ (211) and the terminal identifier obtained from the terminal identifier file as Web contents request information to the Web server (104). The Web server (104) having obtained the Web contents request information transfers the Web contents request information to the service progress dependent information search program (102).

The service progress dependent information search program (102) obtains, from the current service progress information, a current service progress (which is a service progress indicative of the [log-in screen] (211) since the user is browsing the [log-in screen] (211) here) recorded in pair with a terminal identifier contained in the Web contents request information to find based on the obtained current service progress whether the relevant current service progress is registered in a service progress registration section (315 or 319) of the service progress dependent information data base (105).

In the service progress dependent information data base (105), there currently exist two indexes in which the service progress indicative of the [log-in screen] (211) is registered. The service progress (315) registered in the index 003 and the service progress (319) registered in the index 004 are both service progresses indicative of the [log-in screen] (211).

The service progress dependent information search program (102) transfers the indexes 003 and 004 in which the current service progress is registered, the title of the [reserved product confirmation screen] (214) obtained as a result of vicarious execution of the operation information (316) registered in the index 003, the title of the [delivery condition confirmation screen] (215) obtained as a result of vicarious execution of the operation information (320) registered in the index 004 and the terminal identifier contained in the Web contents request information to the service progress dependent information answering program (103).

The service progress dependent information answering program (103) transfers the indexes 003 and 004 and "supplemental contents candidate information" including the titles of the [reserved product confirmation screen] (214) and the [delivery condition confirmation screen] (215) to the Web server (104).

The Web server (104) having obtained the supplemental contents candidate information from the service progress dependent information answering program (103) transmits the supplemental contents candidate information to the Web browser (122).

The Web browser (122) having obtained the supplemental contents candidate information from the Web server (104) displays, on the Web browser screen (141), candidates to be supplemented for the [reserved product confirmation screen] (214) and the [delivery condition confirmation screen] (215). FIG. 16 is one example of a screen showing that there exist candidates to be supplemented for the [reserved product confirmation screen] (214) and the [delivery condition confirmation screen] (215). [1. Confirmation of a reserved product] shown on the Web browser screen (141) in FIG. 16 is a title of the [reserved product confirmation screen] (214). [2. Delivery condition confirmation] is a title of the [delivery condition confirmation screen] (215).

When the user wants to access the [reserved product confirmation screen] (214) with ease, he/she presses the automatic button (142) after pressing [1] of the push button (500) of the telephone set (150).

While the button operation sensing program (153) senses the user pressing the automatic button (142), and confirms the instruction contents by the "automatic button instruction information" and updates the same to instruct the Web browser (122) to register user operation, because the Web browser (122) finds that the automatic button (142) is pressed when a candidate for supplement is presented on the Web browser screen (141), the Web browser (122) obtains the index 003 correlated with the selected number [1] from the Web browser screen (141). The Web browser (122) notifies the button operation sensing program (153) to restore the instruction contents of the "automatic button instruction information".

The Web browser (122) obtains a terminal identifier from the terminal identifier file to transmit the terminal identifier and a supplemental contents index (=index 003) to the Web server (104).

The Web server (104) having obtained the terminal identifier and the supplemental contents index transfers the supplemental contents index to the service progress dependent information search program (102).

Based on the supplemental contents index obtained from the Web server (104), the service progress dependent information search program (102) obtains a service progress and operation information registered in the supplemental contents index from the service progress dependent information data base (105).

Here, since the supplemental contents index is "003", the service progress (315) registered in the index 003 and the operation information (316) registered in the index 003 are obtained. The service progress dependent information search program (102) transfers the above service progress (315) registered in the index 003 and the operation information (316) registered in the index 003 which are obtained by the search to the service progress dependent information answering program (103).

With the service progress (315) registered in the above index 003 as a start point, the service progress dependent information answering program (103) vicariously executes user operation by the operation information (316) registered in the index 003 and transfers the Web contents indicative of the [reserved product confirmation screen] (214) obtained as a result of the execution to the Web server (104).

The Web browser (122) renders the Web contents indicative of the [reserved product confirmation screen] (214) and displays the [reserved product confirmation screen] (214) on the Web browser screen (141).

The telephone set (150) of the present embodiment may be other electronic apparatus such as a personal computer, a portable information apparatus or a television set.

As described in the foregoing, since the Internet shopping server (100) is allowed to record contents of operation by the telephone set (150) used by a user, a service progress as of the operation start and a terminal identifier which identifies the telephone set (150) in combination in the service progress dependent information data base (105), according to a service progress of the user, that is, according to a Web page being browsed in the Web browser (141) and based on operation information recorded in the service progress dependent information data base (105), vicariously executing user operation on the Web page being browsed enables the user to advance to an arbitrary Web page desired.

A third embodiment of the present invention is application of the present invention to a system using automatic answering service by means of a telephone set.

Figure 17:
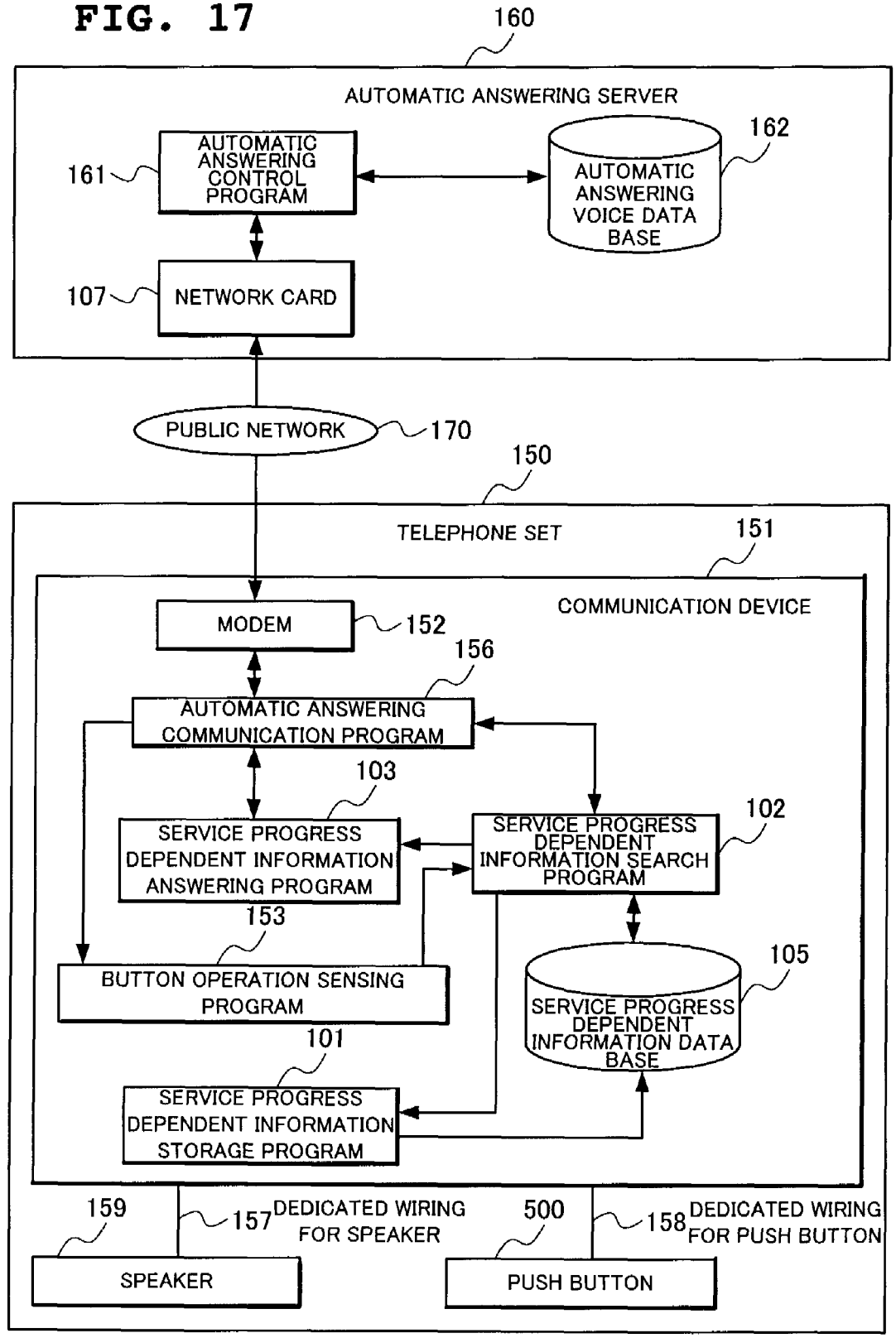
FIG. 17 is a block diagram showing structure of a third embodiment.

FIG. 17 is a block diagram showing structure of the third embodiment.

With reference to FIG. 17, an automatic answering server (160) is mounted on a server computer such as a workstation. The automatic answering server (160) includes an automatic answering control program (161), an automatic answering voice data base (162) and the network card (107) adapted to the Ethernet (registered trademark), which is connected to a public network (170) through the network card (107).

The telephone set (150) includes the communication device (151), a speaker (159) and a push button (500). The communication device (151) includes the service progress dependent information storage program (101), the service progress dependent information search program (102), the service progress dependent information answering program (103), the service progress dependent information data base (105), the mode (152), an automatic answering communication program (156) and the button operation sensing program (153), which is connected to the public network (170) through the modem (152). In addition, the communication device (151) and the speaker (159) are connected by a dedicated wiring (157) for a speaker. The push button (500) is connected by a dedicated wiring (158) for a push button. The public network (170) may include at least one exchange for receiving a calling signal from the telephone set (150) or transmitting a call-up signal.

It is assumed that each program, data and data base on the communication device (151) are physically stored in a hard disk (not shown) provided in the communication device (151) and are transferred from a CPU (not shown) provided in the communication device (151) to a memory (not shown) and executed as required.

The service progress dependent information storage program (101), the service progress dependent information search program (102), the service progress dependent information answering program (103) and the button operation sensing program (153) included in the structure of the third embodiment operate equivalently to those of the first embodiment and the second embodiment.

With reference to FIG. 13 showing the structure of the second embodiment, the automatic answering control program (161) is equivalent to the Web server (104). The automatic answering voice data base (162) is equivalent to the Web contents data base (106) and stores guidance voice data and answering sound data. The automatic answering communication program (156) is equivalent to the Web browser (122). In the present embodiment, among the push buttons (500), a "*" button is assigned to the automatic button (142).

First, description will be made of operation of registering operation information of the push button (500) at the service progress dependent information data base (105) after using automatic answering service which requires pressing of the push button (500) for at least one answering message.

When a user presses a calling button as the push button (500) to bring the telephone set (150) into a communicable state, the service progress dependent information search program (102) is activated. Communicable state of the telephone set (150) denotes a state where upon transmission of a calling signal toward the public network (170) from the communication device (151), an exchange disposed in the public network (170) receives the signal and returns a dial tone, and the communication device (151) receives the dial tone.

When the user designates a telephone number for accessing the automatic answering server (160) (hereinafter referred to as "telephone number [1]") by using the push button (500), the button operation sensing program (153) transfers the telephone number to the service progress dependent information search program (102).

The service progress dependent information search program (102) having obtained the telephone number [1] temporarily holds the telephone number as a current service progress in a memory or the like.

When communication between the communication device (151) and the automatic answering server (160) is established, the automatic answering control program (161) takes out guidance voice data from the automatic answering voice data base (162) to transmit the guidance voice data to the automatic answering communication program (156).

The automatic answering communication program (156) outputs the guidance voice data obtained from the automatic answering control program (161) to the speaker (159).

According to voice guidance by the above guidance voice data (e.g. in a case of service of setting the automatic answering phone at home or confirming recording contents, such voice is output as [please select a menu to be used. For confirming the recording contents of the automatic answering phone, press 1, for changing setting of the automatic answering service, press 2 . . . ]), the user presses the push button (500). Operation information of the push button (500) is accumulated in the button operation sensing program (153) until communication between the communication device (151) and the automatic answering server (160) is cut off.

When the communication between the communication device (151) and the automatic answering server (160) is cut off, the automatic answering communication program (156) notifies the button operation sensing program (153) of communication cut-off.

The button operation sensing program (153) being notified of communication cut-off transfers the operation information of the push button (500) which is accumulated after the communication with the automatic answering server (160) started to the service progress dependent information search program (102).

The service progress dependent information search program (102) having obtained the operation information of the push button (500) from the button operation sensing program (153) transfers the operation information and the current service progress to the service progress dependent information storage program (101).

The service progress dependent information storage program (101) records the current service progress (the telephone number [1] here) and the operation information obtained from the service progress dependent information search program (102) in pair into the service progress dependent information data base (105).

Next, description will be made of operation of pressing the "*" button (=automatic button) to supplement operation information by the service progress dependent information answering program (103) when again using automatic answering service which requires pressing of the push button (500) for at least one answering message.

When a user again designates the telephone number [1] to establish communication between the communication device (151) and the automatic answering server (160), the automatic answering communication program (156) notifies the service progress dependent information search program (102) that the communication is established. Similarly to the above, the button operation sensing program (153) transfers the telephone number [1] to the service progress dependent information search program (102), so that the button operation sensing program (153) holds the telephone number as a current service progress.

Based on the telephone number [1] obtained from the button operation sensing program (153), the service progress dependent information search program (102) being notified that communication is established searches the service progress dependent information data base (105) for registration of the telephone number and notifies the automatic answering communication program (156) of the search result.

The automatic answering communication program (156) having obtained the search result from the service progress dependent information search program (102) confirms the contents of the search result and when the search results in that a partner's telephone number being communicated is not registered in the service progress dependent information data base (105), continues the voice guidance service.

When the contents of the search result are that the partner's telephone number being communicated is registered in the service progress dependent information data base (105), the automatic answering communication program (156) outputs supplement confirmation voice data (e.g. voice guidance for supplement confirmation [We can vicariously execute service you used last time. When vicariously executing input operation, press the "*" button. When not vicariously executing input operation, press the # button.]) through the speaker (159) for making the user to select need/no-need of operation supplement.

When the user presses the "*" button according to the above supplement confirmation voice, the button operation sensing program (153) senses the button operation to transfer supplement request information (denoting that an instruction is made by the user to supplement operation) to the service progress dependent information search program (102).

The service progress dependent information search program (102) having obtained the supplement request information from the button operation sensing program (153) obtains operation information recorded as a pair with the telephone number in question from the service progress dependent information data base (105) based on the current service progress and transfers the operation information to the service progress dependent information answering program (103).

Upon obtaining the operation information from the service progress dependent information search program (102), the service progress dependent information answering program (103) vicariously executes user operation by using the operation information.

As an example of vicarious execution of operation, upon receiving guidance voice data which instructs on input of a customer's number from the automatic answering server (160), the service progress dependent information answering program (103) vicariously executes operation of inputting eight-digit number entered last time by the user and further upon receiving guidance voice data which instructs on selection of a menu to be used from the automatic answering server (160), vicariously executes operation of selecting the "the automatic answering phone recording contents confirmation menu" which is selected last time.

When the operation information recorded in the service progress dependent information data base (105) is executed to the end by the service progress dependent information answering program (103), the automatic answering communication program (156), similarly to a case of actual execution by a user, receives automatic answering phone recording contents data from the automatic answering server (160) to output the automatic answering phone recording contents data to the speaker (159).

The telephone set (150) in the present embodiment may be other electronic apparatus enabling use of automatic answering service such as a personal computer, a portable information apparatus or a television set.

As described in the foregoing, by recording operation information in the service progress dependent information data base (105) on the telephone set (150) so as to be correlated with a partner's telephone number and when accessing the same partner as that of the last time, vicariously executing user operation based on the operation information recorded in the telephone set (150), arbitrary information (the contents of seat reservation, saving balance at the bank, automatic answering phone recorded messages, etc.) desired by a user can be obtained with ease without user's repetitive execution of the same operation.

The present invention realizes easy access to desired information service with a reduced number of executions of operation and without deterioration of visual confirmation even when registering a plurality of pieces of operation information.

When realizing easy access to desired information service by supplementing information, the present invention allows a user to select timing for supplementing, the degree of supplement, a candidate for supplement, a target to be supplemented or the like to realize easy access with a high degree of freedom.

INDUSTRIAL APPLICABILITY

The present invention is applicable to communication apparatuses such as a telephone set, a facsimile machine and a cellular phone, computers such as a personal computer and a portable information terminal, and household appliances such as a television set and a DVD player which enable at least one service contents to be obtained to record and reproduce operation contents with easy operation.

The invention claimed is:

1. An information supplementing method, comprising the steps of:
including an operation terminal and at least one server, wherein
in said server,
recording, in a storage device, a service progress indicative of a degree of a progress of service and operation information in said service progress in pair or said service progress and service contents in said service progress in pair or said service progress, said operation information and said service contents in said service progress in pair as supplemental contents by a service progress dependent information storage unit;
searching the storage device of said service progress dependent information storage unit for supplemental contents recorded as a pair with the same service progress as a current service progress by a service progress dependent information search unit; and
obtaining, by a service progress dependent information answering unit, supplemental contents in said current service progress by said service progress dependent information search unit and by using said operation information contained in said supplemental contents, automatically operating user's operation related to a blank or selections on service contents in the current service progress and a transition between service contents in place of said user to control supplement of said user operation to reach a predetermined service progress from said current service progress, and providing the restored service contents to an operation terminal used by said user,
wherein before recording said supplemental contents in said service progress dependent information storage unit, causing a user to select whether said supplemental contents are to be recorded or not, and controlling existence/non-existence of recording of the supplemental contents according to a selection result of said user applied through an input device, and
when in the same service progress, a plurality of pieces of operation information are stored in said service progress dependent information storage unit, said service progress dependent information answering unit presents at least one operation information among said plurality of pieces of operation information to an output device as a candidate for operation to be supplemented, and a user is caused to input one supplement operation among said presented candidates for operation to be supplemented through an input device.

2. The information supplementing method as set forth in claim 1, wherein when expressly instructed by operation information supplement instructing unit to supplement operation information or when a trigger designated by an operation unit used by the user is performed, the service progress dependent information search unit searches said service progress dependent information storage unit.

3. An information supplementing device included in a server, comprising:

operation information supplement instructing unit, service progress dependent information storage unit which records, in a storage device, a service progress indicative of a degree of a progress of service and operation information in said service progress in pair or said service progress and service contents in said service progress in pair or said service progress, said operation information and said service contents in said service progress in pair as supplemental contents, service progress dependent information search unit which searches said service progress dependent information storage unit for supplemental contents corresponding to a service progress, and service progress dependent information answering unit which restores said searched supplemental contents, wherein upon receiving an instruction from said operation information supplement instructing unit, said service progress dependent information search unit searches for supplemental contents corresponding to a current service progress, said service progress dependent information answering unit obtains supplemental contents in said current service progress by said service progress dependent information search unit and by using said operation information contained in said supplemental contents, automatically operates user's operation related to a blank or selections on service contents in the current service progress and a transition between service contents in place of said user to control supplement of said user operation to reach a predetermined service progress from said current service progress, and provides the restored service contents to an operation terminal used by said user, wherein before recording supplemental contents, said service progress dependent information storage unit causes a user to select whether the supplemental contents are to be recorded or not and controls existence/non-existence of recording of said supplemental contents according to a selection result applied through an input device by said user, and when in the same service progress, a plurality of pieces of operation information are stored in said service progress dependent information storage unit, said service progress dependent information answering unit presents at least one operation information among said plurality of pieces of operation information to an output device as a candidate for operation to be supplemented, and a user is caused to input one supplement operation among said presented candidates for operation to be supplemented through an input device.

4. The information supplementing device as set forth in claim 3, which is connected to at least one server which provides service contents through a communication path, or service contents are stored in said operation terminal used by the user is performed.

5. The information supplementing device as set forth in claim 3, wherein said service progress dependent information search unit is activated during communication with an arbitrary communication partner.

6. The information supplementing device as set forth in claim 5, wherein said operation unit includes an input device provided in said operation terminal or consists of a button presented by said display unit.

7. The information supplementing device as set forth in claim 3, further comprising:

display unit which presents existence/non-existence of supplemental information searched by said service progress dependent information search unit, wherein when the supplemental information exists, said operation information supplement instructing unit is displayed on said display unit or assigned to a predetermined button or input unit.

8. A server comprising:

service progress dependent information storage unit which records, in a storage device, a service progress indicative of a degree of a progress of service and operation information in said service progress in pair or said service progress and service contents in said service progress in pair or said service progress, said operation information and said service contents in said service progress in pair as supplemental contents, service progress dependent information search unit which searches said service progress dependent information storage unit for supplemental contents corresponding to a service progress, and service progress dependent information answering unit obtains supplemental contents in said current service progress by said service progress dependent information search unit and by using said operation information contained in said supplemental contents, automatically operates user's operation related to a blank or selections on service contents in the current service progress and a transition between service contents in place of said user to control supplement of said user operation to reach a predetermined service progress from said current service progress, and provides the restored service contents to an operation terminal used by said user, wherein before recording supplemental contents, said service progress dependent information storage unit causes a user to select whether the supplemental contents are to be recorded or not and controls existence/non-existence of recording of said supplemental contents according to a selection result applied through an input device by said user, and when in the same service progress, a plurality of pieces of operation information are stored in said service progress dependent information storage unit, said service progress dependent information answering unit presents at least one operation information among said plurality of pieces of operation information to an output device as a candidate for operation to be supplemented, and a user is caused to input one supplement operation among said presented candidates for operation to be supplemented through an input device.

9. A server comprising, for each group formed of at least one user:
- service progress dependent information storage unit which records a service progress indicative of a degree of a progress of service and operation information in said service progress in pair or said service progress and service contents in said service progress in pair or said service progress, said operation information and said service contents in said service progress in pair as supplemental contents,
- service progress dependent information search unit which searches said service progress dependent information storage unit for supplemental contents corresponding to a service progress, and
- service progress dependent information answering unit which obtains supplemental contents in said current service progress by said service progress dependent information search unit and by using said operation information contained in said supplemental contents, automatically operates user's operation related to a blank or selections on service contents in the current service progress and a transition between service contents in place of said user to control supplement of said user operation to reach a predetermined service progress from said current service progress, and provides the restored service contents to an operation terminal used by said user, wherein
- before recording supplemental contents, said service progress dependent information storage unit causes a user to select whether the supplemental contents are to be recorded or not and controls existence/non-existence of recording of said supplemental contents according to a selection result applied through an input device by said user, and
- when in the same service progress, a plurality of pieces of operation information are stored in said service progress dependent information storage unit, said service progress dependent information answering unit presents at least one operation information among said plurality of pieces of operation information to an output device as a candidate for operation to be supplemented, and a user is caused to input one supplement operation among said presented candidates for operation to be supplemented through an input device.

10. A server for providing service contents, comprising:
- service progress dependent information storage unit which records a service progress indicative of a degree of a progress of service and operation information in said service progress in pair or a service progress and service contents in said service progress in pair or said service progress, said operation information and said service contents in said service progress in pair as supplemental contents,
- service progress dependent information search unit which searches said service progress dependent information storage unit for supplemental contents corresponding to a service progress, and
- service progress dependent information answering unit which obtains supplemental contents in said current service progress by said service progress dependent information search unit and by using said operation information contained in said supplemental contents, automatically operates user's operation related to a blank or selections on service contents in the current service progress and a transition between service contents in place of said user to control supplement of said user operation to reach a predetermined service progress from said current service progress, and provides the restored service contents to an operation terminal used by said user, wherein
- before recording supplemental contents, said service progress dependent information storage unit causes a user to select whether the supplemental contents are to be recorded or not and controls existence/non-existence of recording of said supplemental contents according to a selection result applied through an input device by said user, and
- when in the same service progress, a plurality of pieces of operation information are stored in said service progress dependent information storage unit, said service progress dependent information answering unit presents at least one operation information among said plurality of pieces of operation information to an output device as a candidate for operation to be supplemented, and a user is caused to input one supplement operation among said presented candidates for operation to be supplemented through an input device.

11. An information supplementing system including an operation terminal and at least one server having an information supplementing device, wherein
- said operation terminal includes
- unit for obtaining service contents, and
- operation information supplement instructing unit,
- said server includes
- service progress dependent information storage unit which records a service progress indicative of a degree of a progress of service and supplemental contents corresponding to said service progress in pair,
- service progress dependent information search unit which searches said service progress dependent information storage unit for supplemental contents corresponding to a service progress, and
- service progress dependent information answering unit which, obtains supplemental contents in said current service progress by said service progress dependent information search unit and by using said operation information search unit and by using said operation information contained in said supplemental contents, automatically operates user's operation related to a blank or selections on service contents in the current service progress and a transition between service contents in place of said user to control supplement of said user operation to reach a predetermined service progress from said current service progress, and provides the restored service contents to an operation terminal used by said user, wherein
- before recording supplemental contents, said service progress dependent information storage unit causes a user to select whether the supplemental contents are to be recorded or not an controls existence/non-existence of recording of said supplemental contents according to a selection result applied through an input device by said user, and
- when in the same service progress, a plurality of pieces of operation information are stored in said service progress dependent information storage unit, said service progress dependent information answering unit presents at least one operation information among said plurality of pieces of operation information to an output device as a candidate for operation to be supplemented, and a user is caused to input one supplement operation among said presented candidates for operation to be supplement through an input device.

12. A non-transitory computer readable medium storing a program which causes a computer forming an information supplementing device to execute the processing of:
  recording, in a storage device, a service progress indicative of a degree of a progress of service and operation information in said service progress in pair or a said service progress and service contents in said service progress in pair or said service progress, said operation information and said service contents in said service progress in pair as supplemental contents,
  searching the storage device for supplemental contents recorded as a pair with the same service progress as a current service progress, and
  obtaining supplemental contents in said current service progress and by using said operation information contained in said supplemental contents, automatically operating user's operation related to a blank or selections on service contents in the current service progress and a transition between service contents in place of said user to control supplement of said user operation to reach a predetermined service progress from said current service progress, and providing the restored service contents to an operation terminal used by said user, wherein
  before recording said supplemental contents in said storage unit, causing a user to select whether said supplemental contents are to be recorded or not, and controlling existence/non\-existence of recording of the supplemental contents according to a selection result of said user applied through an input device, and
  when in the same service progress, a plurality of pieces of operation information are stored in said storage unit, presenting at least one operation information among said plurality of pieces of operation information to an output device as a candidate for operation to be supplemented, and a user is caused to input one supplement operation among said presented candidates for operation to be supplemented through an input device.

13. The non-transitory computer readable medium storing a program as set forth in claim 12, which causes said computer to execute processing of recording, in pair with service progress information, as supplemental contents,
  operation executed from a predetermined communication time point to a time point instructed by operation information supplement instructing unit or,
  operation executed from a time point instructed by said operation information supplement instructing unit to a time point instructed next by said operation information supplement instructing unit or,
  operation executed from a time point instructed by said operation information supplement instructing unit to the end of communication, or
  operation executed from a predetermined communication time point to the communication end.

14. The non-transitory computer readable medium storing a program as set forth in claim 12, which causes said computer to execute processing of causing a user to select whether operation information is to be recorded or not.

15. An information communication system including an operation terminal and at least one server, comprising:
  said server includes
    service progress dependent information storage unit which records supplemental contents with a service progress indicative of a degree of a progress of service and operation information in said service progress in pair,
    service progress dependent information search unit which, upon receiving an instruction to supplement operation information, searches said service progress dependent information storage unit to obtain operation information recorded in pair with a service progress coincident with a current service progress in a time point of said operation terminal being operated by the user,
    service progress dependent information answering unit which obtains operation information in said current service progress by said service progress dependent information search unit and by using said operation information obtained, automatically operates user's operation related to a blank or selections on service contents in the current service progress and a transition between service contents in place of said user to control supplement of said user operation to reach a predetermined service progress from said current service progress, and provides the restored service contents to an operation terminal used by a user,
  said operation terminal includes
    service contents acquisition unit which obtains service contents with operation information supplemented from said service progress dependent information answering unit, and
    operation information supplement instructing unit which instructs on supplement of operation,
  wherein
  in said operation terminal, said service contents acquisition unit being instructed to supplement operation notifies supplement request information to said service progress dependent information search unit of said server,
  said service progress dependent information search unit having obtained supplement request information from said service contents acquisition unit of said operation terminal collates a terminal identifier contained in the supplement request information and a terminal identifier contained in current service information, obtains a service progress recorded in pair with the terminal identifier contained in the supplement request information, collates the obtained service progress and a service progress recorded in said service progress dependent information storage unit and obtains operation information recorded in pair with said service progress to transmit said service progress and the operation information, and the terminal identifier obtained from the service contents acquisition unit of said operation terminal to said service progress dependent information answering unit, and
  said service progress dependent information answering unit, upon obtaining a service progress, operation information and a terminal identifier transmitted from said service progress dependent information search unit, supplements user operation to reach a predetermined service progress from the service progress by vicariously executing user operation based on the operation information, and provides a result of the supplement to said operation terminal,
  wherein before recording supplemental contents, said service progress dependent information storage unit causes a user to select whether the supplemental contents are to be recorded or not and controls existence/non-existence of recording of said supplemental contents according to a selection result applied through an input device by said user, and
  when in the same service progress, a plurality of pieces of operation information are stored in said service progress dependent information storage unit, said service progress dependent information answering unit presents at least one operation information among said plurality of pieces of operation information to an output device as a candidate for operation to be supplemented, and a user is caused to input one supplement operation among said presented candidates for operation to be supplemented through an input device.

16. The information communication system as set forth in claim 15, wherein when registering operation information at an operation terminal of a user, an operation information start request is transmitted from said operation information supplement instructing unit to said service progress dependent information search unit, said service progress dependent information search unit obtains a service progress at operation start, said operation terminal stores information of operation executed by said operation terminal and at the end of operation to be registered, transmits said operation information together with an operation information registration request from said operation information supplement instructing unit to said service progress dependent information search unit, and said service progress dependent information search unit having received said operation information registration request records supplemental contents with a service progress at operation start and its corresponding operation information paired.

17. An information communication system including an operation terminal and a server connected to said operation terminal by communication in which a user sequentially executes predetermined input operation by said terminal according to each operation process to provide desired service to said operation terminal side through said server, wherein said server comprises a data base which stores, to be correlated with each operation process, input operation information applied in one operation process from the start of operation executed on said terminal in relation to provision of said service to the end or a series of input operation information applied from said one operation process to other operation process downstream said one operation process, a search unit which, upon input of an operation supplement instruction in one operation process by predetermined input unit of said operation terminal, receives said operation supplement instruction from said operation terminal to search whether input operation information correlated with said one operation process at said operation terminal is registered in said data base, and an answering unit which, when search by said search unit results in finding that in relation to said operation terminal, input operation information correlated with said one operation process or with a process from said one operation process to other operation process downstream said one operation process is registered in said data base, obtains said input operation information from said data base and by using said input operation information, automatically operates user's operation related to a blank or selections on service contents in the current service progress or a transition between service contents in the current service progress and a transition between service contents in place of said user to control supplement of said input operation by the user operation to reach a predetermined service progress from said current service progress, and provides the restored result to said operation terminal used by said user, wherein before recording input operation information, said data base causes a user to select whether the input operation information are to be recorded or not and controls existence/non-existence of recording of said input operation information according to a selection result applied through an input device by said user, and when in the same service progress, a plurality of pieces of input operation information are stored in said data base, said answering unit presents at least one input operation information among said plurality of pieces of input operation information to an output device as a candidate for operation to be supplemented, and a user is caused to input one supplement operation among said presented candidates for operation to be supplemented through an input device.

18. The information communication system as set forth in claim 17, wherein said operation terminal is a telephone set, said server is a server accessed by said telephone set, and in said data base, a telephone number for accessing said server and input operation information at said telephone set are registered correlated with each other as said operation process and said input operation information related to said operation terminal.

19. The information communication system as set forth in claim 17, further comprising unit for registering operation information applied at said operation terminal in said data base so as to be correlated with said operation process.

* * * * *